United States Patent
Wang

(10) Patent No.: US 9,558,665 B2
(45) Date of Patent: Jan. 31, 2017

(54) METHOD AND SYSTEM FOR AVOIDANCE OF PARKING VIOLATIONS

(71) Applicant: Kevin Sunlin Wang, Flushing, NY (US)

(72) Inventor: Kevin Sunlin Wang, Flushing, NY (US)

(*) Notice: Subject to any disclaimer, the term of this patent is extended or adjusted under 35 U.S.C. 154(b) by 0 days.

(21) Appl. No.: 14/832,584

(22) Filed: Aug. 21, 2015

(65) Prior Publication Data
US 2016/0155332 A1 Jun. 2, 2016

Related U.S. Application Data

(60) Provisional application No. 62/086,560, filed on Dec. 2, 2014, provisional application No. 62/092,100, filed on Dec. 15, 2014, provisional application No. 62/113,922, filed on Feb. 9, 2015, provisional application No. 62/150,118, filed on Apr. 20, 2015.

(51) Int. Cl.
*B60Q 1/48* (2006.01)
*G08G 1/14* (2006.01)
*G08G 1/01* (2006.01)

(52) U.S. Cl.
CPC ............... *G08G 1/148* (2013.01); *G08G 1/01* (2013.01)

(58) Field of Classification Search
CPC ........................................................ G08G 1/148
USPC ........................... 340/932.2; 705/13; 701/117
See application file for complete search history.

(56) References Cited

U.S. PATENT DOCUMENTS 8,063,797 B1* 11/2011 Sonnabend et al. ....... 340/932.2
8,229,658 B1* 7/2012 Dabell ......................... 701/117
8,432,297 B2 4/2013 Sonnabend et al.
8,612,136 B2 12/2013 Levine et al.
8,698,649 B2 4/2014 Denaro
9,171,461 B1* 10/2015 Dabell ................. G08G 1/0137
2007/0216521 A1 9/2007 Guensler et al.
2013/0138481 A1* 5/2013 Handley ................ G06Q 10/00 705/7.37
2014/0266800 A1 9/2014 Koukoumidis et al.

FOREIGN PATENT DOCUMENTS

DE 102010020135 11/2011
WO WO 2004/092876 10/2004

* cited by examiner

*Primary Examiner* — Brent Swarthout
(74) *Attorney, Agent, or Firm* — F. Chau & Associates, LLC

(57) ABSTRACT

Disclosed is a system and method for alerting users on how to avoid receiving parking violation citations. A location determining apparatus identifies a location of a user. A database stores historical parking violation citations, real-time crowdsourced parking violation citations, and other parking violation related information with a verification algorithm and an inference algorithm. Parking intent is determined by a user's location and speed and once the determination is made, the database is polled to identify whether potential parking violations exist, where an alert will be sent. A forum functionality allows information exchange and idea sharing about parking violation citations and avoidance thereof. Crowdsourced parking violation related data is gathered using an incentive method with rewards and a parking ticket payment module collects parking violation-related information for the database. Historical weather data is used to predict the impact on current parking situations.

30 Claims, 15 Drawing Sheets

METHOD AND SYSTEM FOR AVOIDANCE OF PARKING VIOLATIONS

CROSS-REFERENCE TO RELATED APPLICATION

The present application is based on provisional application Ser. No. 62/086,560, filed on Dec. 2, 2014, provisional application Ser. No. 62/092,100, filed on Dec. 15, 2014, provisional application Ser. No. 62/113,922, filed on Feb. 9, 2015, and provisional application Ser. No. 62/150,118, filed on Apr. 20, 2015, the entire contents of which are herein incorporated by reference.

TECHNICAL FIELD

The present disclosure relates to violation avoidance and, more specifically, to a method and system for avoidance of parking violations.

DISCUSSION OF THE RELATED ART

Local parking ordinances and rules frequently regulate where and for how long a vehicle may be parked along public roadways. A driver that parks a vehicle in a manner that is not permitted under such ordinances and rules may be described as having committed a parking violation. When a law enforcement officer such as a police officer or traffic enforcement officer finds a vehicle parked in such a manner, they will generally issue a citation. This citation may be referred to as a parking ticket or parking violation citation. Accordingly, both the act of parking a vehicle in an impermissible manner and the ticket issued for doing so may be referred to as a parking violation.

Tickets issued for parking violations may be difficult to contest successfully and may carry a significant monetary penalty. Additionally, parking violations can impede the flow of traffic, interfere with the operation of public transportation and sanitation services, and block emergency and essential services from being effectively delivered. Accordingly, it is in the public interest to increase adherence to parking rules.

However, parking rules can be very complex, especially in large cities such as New York City where there may be a large number of reasons for restricting where people can park and a high demand for parking spaces. It is therefore common for drivers to accidentally commit parking violations even when they have no intention to violate the rules. The constant congestion and lack of parking spaces paired with the continuing increase of vehicles on the road also exacerbates the current rate of parking violations.

Although parking rules themselves may be clear, sometimes they are not very clear when applied in real parking situations on the street. Drivers often times find themselves receiving parking violation tickets due to a lack of understanding or confusion about the parking rules and signs at specific locations.

For example, the Rules of the City of New York (hereinafter "Rules of NYC") are clear in stating that a vehicle cannot be parked over a pedestrian crosswalk at any time. However, there are misunderstandings if the crosswalk line is not completely drawn from one side of the street to another like parking at the location indicated in Queens, N.Y. on parking citations as "E/S Calloway St. 0ft N/of Otis Ave." (East Side Calloway Street Zero feet North of Otis Avenue). Drivers might misunderstand the incomplete marking and believe that parking is allowed since the vehicle does not overlap the crosswalk line as it is incomplete. However, it is a violation because the vehicle is actually partially parked over the pedestrian crosswalk even though there is no clear completely painted line. According to NYC Open Data, there have been around 100 parking tickets issued over a year at this location.

In a second example, people generally know they cannot park at or within a certain distance, e.g. 15 feet, of a fire hydrant at any time according to the Rules of NYC, but are often confused as to the actual allowable distance away from the fire hydrant where a vehicle may be parked. For example, drivers have received tickets at two hydrants on consecutive blocks in Manhattan at "Opposite 152 Forsyth St." and "Opposite 104 Forsyth St." because they did not know or may be confused when they were parking in illegal parking spaces which were parallel to a hydrant but were separated by a bike lane in between. NYC Open Data shows that over 200 tickets have been issued collectively for these two hydrant locations in a period of around seven months.

In a third example, parking signs may state that the time restriction for parking is not only during certain periods of times during a day or days of the week, but also for certain months or dates of the year. Because of the complexity of urban parking restrictions, drivers may be confused whether parking is permitted in a given location at a particular day and time. Drivers wishing to abide by parking rules may take care to examine signage that may be posted in the vicinity of a parking spot but parking signs may be difficult to interpret when the signs seem to describe complicated rules. Three overlapping signs at Prospect Park West and Ninth St. in Brooklyn, N.Y. stating, "No Standing Anytime"; "No Standing, April 1-September 30, 8 AM-10 PM, Including Sunday"; and "No Parking, 11:30 AM to 1 PM, Tues" cause confusion as drivers may not have understood the meaning of the April 1-September 30 restriction which applied the date restriction of no standing for the 24 hours of the whole day from April 1 to September 30, and not just from 8 AM to 10 PM. NYC Open Data shows that around 300 tickets have been issued in 2014 due to these confusing signs.

The law specifies what is prohibited in general but does not address every detail of what is prohibited in the practical matter of real parking situations. Therefore, it is an object of the present invention to provide a resource to Users to inform or educate them as to what the law prohibits as a practical matter in relation to the parking rules, regulations, and citations by using historical and real time crowdsourced information available on parking tickets. By placing a major focus on analyzing ticket information, exemplary embodiments of the present invention may assist the User to understand how the parking rules, regulations, laws, citation codes, etc. (hereinafter, "RRLC") is applied to the real street parking situations for specific locations to avoid parking violations.

SUMMARY

Exemplary embodiments of the present invention relate to alerting a user of potential parking violations at an intended parking location identified by the user's vehicle's speed and location when the vehicle is traveling towards a location with potential or previous parking violations. Exemplary embodiments of the present invention may integrate with one or more mobile device units or in-vehicle navigation systems. A location determining apparatus is used to identify a current location of a user. A clock mechanism is used to determine a present time and date. The method and system may identify the time and current location of the user and correlate such location and time in a unified database of parking violation citations that includes historical and real time crowd-sourced parking violation citations. The unified database stores parking rules, violation codes, abbreviations used by law enforcement, and historical records of issued parking violation citations and real-time crowdsourced records of issued parking violation citations. Exemplary embodiments of the present invention may use the stored data from the unified database to provide drivers with accurate and effective notifications on the reasons behind parking violations in certain locations.

Each of the issued parking violation citations includes geolocations, one or more reasons, and time and date information pertaining to where and when the issued parking violation citation was issued. The illegal parking spots indicated on issued parking violation citations can be mined to infer the times, dates (e.g. hours of the day and the days of the week), and distances which a vehicle is prohibited to park at a given location. A processing apparatus cross-correlates the identified present time and the identified current location of the user with the time and date information and geolocation information of each of the issued parking violation citations to predict a likelihood of the user receiving a parking violation citation at the identified current location and the determined time and date.

Exemplary embodiments of the present invention may also utilize a specialized incentive structure which may offer rewards to users to encourage active participation in information sharing activities. The system may use a verification algorithm to verify the accuracy of the collected data. A display apparatus associated with a mobile device of the plurality one or more of mobile device units or the in-vehicle navigation system is used to present an alert pertaining to the estimated likelihood of the user receiving a parking violation citation, and to display information pertaining to the issued parking violation citations cross correlated to the identified current location and the determined time and date. A forum module allows a plurality of users of the plurality of one or more mobile device units to exchange of information and share ideas about parking violation citations and avoidance thereof. A system in accordance with exemplary embodiments of the present invention may allow users to share their experiences and ideas related to parking tickets and avoidance thereof. A ticket payment module allows the user to pay fines incurred as a result of a received parking violation citation. The ticket payment module accesses third-party APIs or websites to accept and process payments.

A computer system includes a microprocessor and a non-transitory, tangible, program storage medium, readable by the computer system, embodying a program of instructions executable by the microprocessor to perform method steps for alerting a user on how to avoid receiving a parking violation citation. The method steps include receiving a geocoded location of a user, receiving data pertaining to historical parking violation citations from a unified database, receiving vehicle data from the user including a type of vehicle and type of vehicle plate, analyzing and verifying the received geocoded location, the data from the unified database, the vehicle data received from the user and identifying highly relevant data therefrom, and displaying the highly relevant data to alert the user as to a probability of receiving a parking violation citation at the location of the user.

A method for alerting a user on how to avoid receiving parking violation citations includes receiving a geocoded location of a user, receiving data pertaining to historical parking violation citations from a unified database, receiving vehicle data from the user, analyzing and verifying the received geocoded location, data from the unified database, vehicle data from the user to identify relevant data therefrom, comparing different parking rules between the identified current location of the user and a location obtained from the user's driver license information stored in a user profile, and displaying the relevant data to alert the user.

Users who have the authority to use the tow zone may register their towing related information or other Users may report this information to the system, which will be used to alert other Users to avoid having future vehicles towed. Users who are unauthorized to park in parking spaces designated as tow zones may receive notifications alerting them in advance to avoid parking violations from illegally parking in a tow zone. If the User's vehicle is towed after illegally parking in a tow zone, the system may be used to assist the user in finding the vehicle. Analyzing available data in the unified database to discover either patterns or single matters on the reasons for parking violations and providing timely notifications of the potential violations, etc. may produce safer streets by reducing and/or preventing parking violations through education and awareness. Exemplary embodiments of the present invention may place a focus on the avoidance of parking tickets as people in general may be concerned with tickets as they contain fines or penalties. Providing a useful resource for users by compiling the ideas about all aspects of the situation that lead to avoiding ticket violations will help Users avoid future parking violations.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1A:
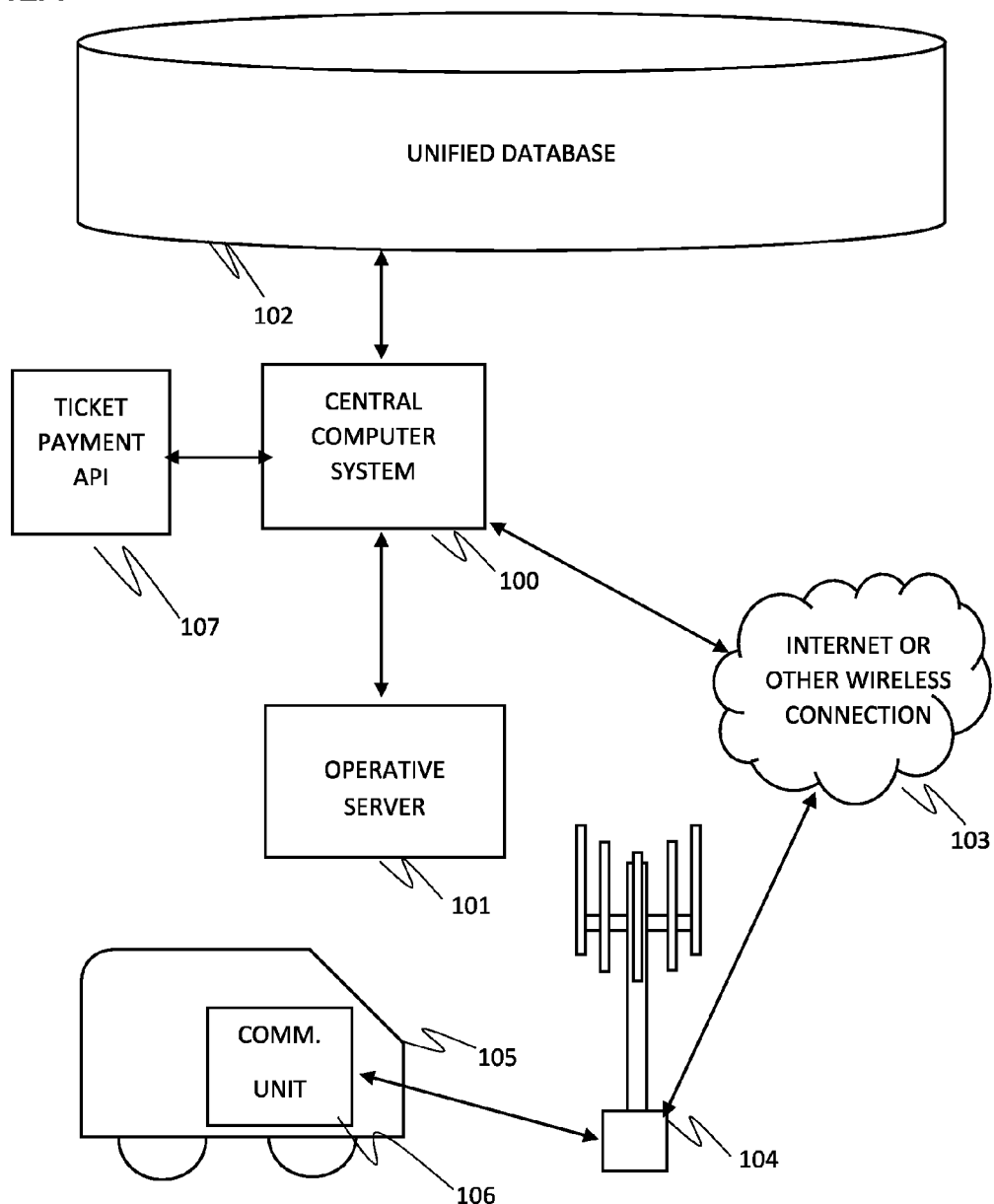
FIG. 1A is schematic diagram illustrating a system for using data from the Unified Database to alert drivers of parking violation occurrences in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. Although the invention may be described herein with reference to a modern metropolis such as NYC as the main example for implementation, the system and method is applicable worldwide. The terms "driver(s)" may be used interchangeably with "User(s)", which is intended to encompass not only driver(s), but those individuals who may not be a driver or driving but assist drivers by using the invention. The invention may assist both Users and drivers to avoid parking tickets. The terms "parking citation(s)", "parking ticket(s)", or "parking violation citation(s)" may be used interchangeably, but their meanings are one and the same: a ticket received by a driver for a parking violation.

The system and method may integrate an electrical/digital map (such as Google Maps™, which is an electronic mapping service provided by Google Inc., etc.) of the mobile application on smartphone/Web-based/storage media. With this integration, roadways may be displayed from the map database which presents the analyzed data as to the location and explanations of ticket violations that are easily understood by the User.

An exemplary system of the present Application may connect internally with various functions of a mobile device that include but are not limited to the clock function, phone call function, microphone, GPS tracking for geolocation mapping (latitude and longitude coordinates), and/or camera, etc. The mobile application can run on the mobile device and utilize resources which may include microprocessor, memory, GPS, wireless connection and display. Notifications can be accomplished through one or more media such as the visual display or audio system, etc.

Exemplary embodiments of the present invention may provide a platform for the collaboration and sharing of information regarding parking citations. Parking violation data may be processed from various sources that include, but are not limited to the government, government agents, municipalities, non-government organizations (NGO's), private entities, community organizations, interested individuals or Users, websites containing useful information such as law enforcement abbreviations, blog posts, social networks, newspapers, professional articles, and any other resources where historical parking violation-related data can be collected etc. (hereinafter, "Informational Sources"). Some of the parking violation data may be provided as public open data from the government agencies and may also be available through a request from the Freedom of Information Act if not available through public government websites. However, when no open government parking citation data is available, the system may obtain historical parking citation data through the input from Users and/or interested individuals and an Administrator of the system may also collect parking citation information from private entities, for example, transportation companies, or any other organizations that specialize in transportation who may have access to issued parking citations. The database may utilize a collection system and method for collection of information regarding parking violation related information from the Informational Sources. Other information from newspapers, blogs, social media, etc. may be collected and summarized by an Administrator of the system or employee of the system to supplement the database. This collected parking citation data may also be supplemented by real-time crowdsourced ticket information from Users.

Government parking related data may be available through the applicable authority's website and/or publically accessible open data. Although locations from government data regarding ticket information are not as accurate as geolocation coordinates, it is still useful because it provides citation data in the major parts that are credible and resourceful even though it is incomplete, not updated in a timely manner, and contains errors, etc. Therefore, locations from government citation data may be transformed to geolocation coordinates through various third party software, e.g., SmartyStreets™, which is a location geocoding service for latitude and longitude coordinates provided by SmartyStreets, LLC, etc. before the citation location data is input into the database of the system.

Another source for parking violation citation related data may be obtained from connecting to relevant government or law enforcement websites that store parking citation information on the specific User. Through this connection, Users may check their unpaid pending ticket information through the mobile application. Additionally, the system may obtain authorization from the User to automatically search for existing violations, whether pending or unpaid, for the User by using identifying information. If there are any violations which are still pending or unpaid, then the system may send a notification to the User about their currently unpaid pending violations. With the authorization from the User, the system may also use the information from these violations to be input as data into the historical database to further build the updated comprehensive database to alert other Users with the reasons and summary of the historical violations, etc. to avoid future violations. The system may also send additional notifications to Users whose pending or unpaid parking tickets have either accumulated to a certain amount before the User reaches the indicated threshold amount that may subject the User to adverse consequences; has reached the threshold amount; and/or has passed the threshold amount by choice or preference of Users who may set up in the system in advance. For example, in NYC, the threshold amount is $350 in unpaid parking tickets before a driver's vehicle may be towed regardless of whether or not a vehicle is legally parked. Accordingly, the User may receive a notification from the system indicating that the User has for example, $300 in pending or unpaid parking tickets as it is approaching the threshold amount of $350 and the User is at risk of having their vehicle towed once the User reaches $350 and has not yet paid these accumulated ticket penalties. The system may also assist the User in finding their vehicle by providing relevant towing information if the User's vehicle has been towed as a result of the accumulated unpaid parking tickets that reach the threshold amount.

Exemplary embodiments of the present invention may add to the database by using information as reported by Users to update, verify and supplement the database from government data. Exemplary embodiments of the present invention may continuously collect, analyze, and update the various citation data to build a more accurate, up-to-date database. The system and method may include an incentive structure paired with an Administrative quality control center to ensure the data quality and reliability of the data analyses and the information dispersed to Users.

Exemplary embodiments of the present invention may crowdsource information about parking tickets that were reported by Users and/or collected by the Administrator of the system. Crowdsourcing is a distributed problem-solving method that utilizes online and offline resources to compile services, ideas, and/or content by the solicitation and/or capturing of data from a variety of people native to a special community that is targeted by the crowdsourced subject. Crowdsourced information may be used in gathering data that is current, updated, and readily available in real time in order to provide firsthand information through personal knowledge and/or experiences. Crowdsourcing is also effective in gathering information not provided by government data. However, crowdsourcing citation data is costly as Users share their experiences after incurring the costs of ticket violations. Crowdsourcing information may update, supplement and verify the Unified Database by using information as reported by Users or collected by the Administrator of the system. The system may use incentives where rewards may be given to encourage the reporting of parking ticket related information by Users to update and supplement the system.

For the purpose of crowdsourcing parking related information, the system may include a central computer system connected to the Internet and the plurality of mobile devices capable of determining their geographic locations according to geolocation and transmitting ticket related information into the central computer system. The central computer system continuously maintains the Unified Database of crowdsourced data along with data received from various Informational Sources, analyzes User reports, detects patterns for locations or possible individual isolated violations at locations, and provides real-time alerts to a plurality of Users connected to a network through their mobile communications devices. Each input may be assigned a unique tracking number and this unique number may be transmitted to the remote server accompanied by the current position of the User/mobile phone.

Exemplary embodiments of the present invention may promote transparency and accuracy for parking violations in utilizing combined raw data from various sources by creating a database and platform for Users to access collected information in a User-friendly, mobile device application interface. To build the Unified Database, raw parking ticket citation data may be obtained from Informational Sources which may be uploaded to a computer microprocessor and formatted to include only relevant information needed for running analyses and providing notifications. The uploaded citation data may be then split into two sets for cleaning and uploading into the system's server. The first set may be citation data which is already verified as having all the necessary information in the right format while the second set may be citation data which needs to be reformatted to include all the necessary information. Once all citation data has been cleaned, the address data may be extracted in a data frame to be used in a third party geocode API, for example, Google Geocoding API™, which is a location geocoding service provided by Google Inc., or SmartyStreets™, which is a location geocoding service for latitude and longitude coordinates provided by SmartyStreets, LLC, etc. to output a .csv file with all the geocoded information of locations relative to each ticket. The output may be reviewed and corrected by the Administrator of the system for accuracy and completeness. Parking signs data and RRLC data files may also be uploaded, cleaned and merged with the citation data into the Unified Database.

The raw data entered, processed, stored, and analyzed may include but is not limited to: the type of violation; the causes/reasons for the violation; name of law enforcement officer who issued the ticket; law enforcement officer comments on the ticket; Registration State; Plate Type; Vehicle Type; Issue Date; Violation Code; Violation Statutory Code; Issuing Agency; Violation Time; House Number; Street Name; Law Section; Sub Division; Violation Legal Code; Days Parking In Effect; From Hours In Effect; To Hours In Effect; Violation Description; and/or any other relevant factors, etc. Reasons for parking ticket violations include but are not limited to: Hydrant, Bus Stop, Street Cleaning, Private Parking, Tow Zone, Time Restrictions, No Standing, No Parking, Parking in the Wrong Direction, Parking longer than Maximum Time, Crosswalk, Railroad Crossing, Street Crossing, Double Parking, Handicapped Zone, Permit Required, Semi-Private Parking, No bike parking, and other reasons, etc. For example, in NYC, the Department of Finance uses violation codes to issue parking tickets while these violation codes contain reasons linked to violation statutory laws written into Chapter 4 Section 4-08 of Title 34 of the Rules of NYC. Parking violation reasons may be matched with their respective violation codes, which may be used to inference parking violation reasons for specific locations and generate applicable alerts for Users.

The system may integrate algorithms to detect duplicate data if the tickets issued on dates and times that match those in the database may be labeled as duplicate data, which may be automatically rejected. However, tickets issued on dates and times not included in the database may be added to the historical database and notifications will be updated to properly reflect added data to properly alert Users with updated information.

The database may also include other types of publically available useful and critical resources, for example, abbreviations and their common meanings as used by law enforcement. Law enforcement officers often use abbreviations when issuing tickets. On the ticket, the abbreviations may appear in the area where the officer specifies the violation and/or location of the violation. Abbreviations may be processed and stored in the database by gathering data from publically available sources to provide the most accurate and up-to-date meanings. Users may be able to check the language by using the system to automatically change the abbreviations to plain English meanings according to their location when typing them into the mobile application. The function may also be used when a User reports their ticket that contains abbreviations. For example, a User receives a ticket violation for parking their vehicle in violation of the law at a certain location and intends to report. The ticket violation states, the "Place of Occurrence" is "E/S Calloway St. 0ft N/of Otis Ave." The User may for example, type the abbreviated language into the mobile application when reporting, and then the system may automatically change the abbreviations to their plain and easily-understandable English explanations and then convert the address into a geolocation. For example, tickets with confusing abbreviations, "E/S Calloway St. 0ft N/of Otis Ave." would be changed to "East Side Calloway Street Zero feet North of Otis Avenue" and then used to create the accurate geolocation through a third party's geolocation API to be entered into the database. The geolocation can then be used to alert other Users. Users may earn rewards if they report any incorrect or inconsistent abbreviations and the Administrator of the system verifies and corrects the information.

The database may also include parking sign information, for example parking sign location information and parking sign images from the websites of various government sources (e.g. Department of Transportation, hereinafter "DOT"). Parking signs that apply to a User's current location may be automatically displayed for the User on the screen of the mobile communications device or in-vehicle navigation system after a User temporarily stops or parks in a location. If the User does not understand the sign or has any questions, the User may press on this image of the sign to direct the system to open the forum function where the User may report the sign information and view any exchanged information from other Users for this sign that is connected to the current location. If parking sign information is not available from government resources, the User may choose to submit parking sign information for the applicable parking signs where the User may qualify for rewards, and/or have an employee sent to the location to obtain parking sign information. Accordingly, the User may not have to physically leave their vehicle to spend time walking to the sign to figure out if parking is allowed, putting them at risk of receiving a ticket during this time. The parking sign image notification may include a rating system so the User may rate or indicate inaccurate information if there are errors or the sign is missing.

The potential User may be asked to register with the service by providing driver's license pertinent information such as their name, email address, plate information such as type of plate, type of vehicle, and the state/country issuing the driver license to create a User ID for each User of the mobile application. User IDs are necessary for the purposes of tracking reports and ratings made by each User. Credit card and/or debit card information may also be requested for subscriber fees for certain services the mobile application provides for a certified User. Certified Users may be allowed to use various features of the mobile application which includes but is not limited to reporting information and rating information. The subscriber fees collected may also directly or indirectly constantly fund the source used to help pay for User's incurred tickets as a part of the reward system in order to obtain more ticket information.

The system may include a User profile database configured to store User information and associations between each User and their mobile device after registering. Once registered, Users may set and change their information in their User profile if necessary. Settings that may require a User's input or preference may be subsequently changed by the User within the settings of the mobile application (e.g. on/off). For example, the User may change the type of vehicle they are currently driving in the case they switch vehicles if necessary. Accordingly, this is also applicable to the type of plate associated with the vehicle. Additionally, Users who do not possess a vehicle may still be able to select and/or change their vehicle type or plate type in order to receive information from the system. The system of the mobile application may recognize two types of Users: non-commercial vehicle Users and commercial vehicle Users. Since different RRLC may apply to non-commercial and commercial vehicles resulting in different types of ticket violations which may be categorized in the system, Users who indicate in their profile that they drive a commercial vehicle may be automatically marked in the different category for only commercial vehicles. Non-commercial vehicles may include but are not limited to: passenger cars, mini-vans, SUVs, etc. Within the commercial vehicles database of the system, the type of commercial vehicle may be split into categories, which may include, but are not limited to, tractor-trailers, trucks, buses, taxis, and limousines, etc. Parking rules applicable to commercial vehicles may not also be applicable to non-commercial vehicles, which necessitates the need to separate data from different types of vehicles into different categories so that the tickets may also be categorized depending on the vehicle and the violation reasons. Also, the system of the mobile application may allow commercial vehicle Users to enter ticket violation information which will be separately divided in the database according to categories, of which the reasons may be specific to commercial vehicles. For example, drivers of non-commercial vehicles may receive tickets for parking in a commercial vehicle only standing zones which only allow commercial vehicles to load and unload cargo. Therefore, the citation database may include citation data from non-commercial vehicles and commercial vehicles, which will be separately labeled according to the type. Vehicle type data may show patterns for different types of vehicles which commit the violations. Although there are two kinds of vehicles that have their respective databases, the two types may be combined and integrated in one Unified Database in the system. The Users may then be notified about different tickets that occurred at an impact zone and isolated incidents of single violations. The impact zone may encompass an area which may be within a certain radius of the location with previously issued parking violations. The impact zone may determine whether a User will receive a notification for parking a vehicle within the indicated area because of any applicable rules for parking violations. For example, a User whose profile indicates they are driving a non-commercial vehicle will receive a notification when trying to park in a commercial vehicle only standing zone which only allows commercial vehicles to load and unload cargo, while a commercial vehicle driver loading cargo would not receive this alert. Through this method, notifications are more accurate since tickets may be grouped in separate categories depending on the type of vehicle and types of vehicle plates, which may be included in commercial vehicles or non-commercial vehicles.

Since there are different categories within commercial vehicles, the system may also sort and categorize data depending on vehicle type, plate type and the issuing agency of the specified parking violation. Information may be inferred depending on plate type, vehicle type and issuing agency. The same rules may apply to the same category of vehicle or the same type of plate, which may be regulated by a specific agency. Different issuing authorities may have different rules and regulations that apply only to the vehicles they have the authority to regulate which necessitates categorization of violation citation data based on types of vehicle and also types of plate in order for the system to provide proper notifications to Users who may be driving different types of vehicles. This categorization may be applicable to both commercial and non-commercial vehicles. However, law enforcement has the authority to regulate all types of vehicles and issue parking violation citations to them all. Accordingly, the system may generate alerts as the same rules apply for the same plate type, but may also analyze if the same rules apply to different types of vehicles. The system may sort violation citation data into the same categories that parking rules will apply where each violation citation datum includes but is not limited to time, reasons, location, type of vehicle, and type of plate etc. for the received parking violation citations. Since some rules may apply to all vehicles with a specific plate type or a specific vehicle, then the system may send alerts to all applicable vehicles. For example, in NYC, the Taxi and Limousine Commission (hereinafter, "TLC") regulates commercial vehicles which have a plate beginning with the letter, "T." TLC officers have the authority to issue specific types of tickets unique to TLC vehicles based on TLC regulations but do not have the authority to regulate other commercial vehicles, for example buses, which is regulated by the DOT.

Exemplary embodiments of the present invention include a method and system of a mobile application for mobile device notifications in different situations. These notifications may be generated from the Unified Database that involves the processing and analysis of several data set components: available historical and compiled data from Informational Sources; real-time data as crowdsourced from User's inputted parking violation related information; crowdsourced parking violation dispute related information to assist/advise ticket disputes; rules and abbreviations data; parking meter locations and parking meter fees data; ticket dispute data from Users and any and all supplemental information as provided and/or verified by the Administrator of the system, all of which are subject to review and/or ratings. Data may be labeled in the database according to its source. The system may use a team of professional individuals with relevant expertise in parking violations and/or parking rules to verify and provide more accurate data for the database. Notifications may be changed or updated depending on data gathered and User reports.

Notifications within the mobile application may be short alerts stating the reasons on why a User may not park in the space with other brief information that summarizes the historical violation data at the location. They are brief because Users may receive these notifications on their mobile communications device and may be either driving when looking for parking or distracted from conducting other activities. Notifications alerting Users are generated based on the different categories, types of vehicles, and/or type of plate applicable to the User receiving the notification. One type of notification may include information about the potential violation such as dates and time frame applicable to the violation, historical summary of violation citations at the current location, reason(s) for the violation, etc. The historical summary of ticket information may contain a time frame from certain dates that are reflected in the data (for example, date, month, time, etc.), parking violation reasons, applicable penalties, total penalties collected, categories of ticket types and their applicable penalties, and the number of tickets issued within the time frame to educate the User and act as persuasive information in order to inform the User of the potential consequences of parking in a certain location to avoid the User from taking a chance to park in the location with violations.

Another type of notification may appear when the system displays a comparison of parking rules applicable at different jurisdictions, for example, rules that apply at the current location and rules of the State that issued the User's Driver License. For example, a User whose driver license is issued in Connecticut may not know that parking is not allowed within 15 feet of a hydrant in New York since the rule in Connecticut is set at 10 feet away from hydrant. Among other instances, the User may be able to view this notification information at any time, by pressing a button on the screen of their mobile device at the location to check for parking violations or to check for differing parking rules. Users may rate the information on the notification and also report the notification to the Administrator of the system if they think there is inaccurate or false information.

As the system of the mobile application records and stores accurate geolocation GPS coordinates (longitude and latitudes) of the mobile device, the alerts sent to a User can be customized and localized to the User's location within a certain radius which represents the impact zone. Since the database stores and analyzes RRLC from different municipalities and/or other authorities, the system may match geolocation and applicable RRLC to send notifications according to the User's location or a location indicated at a User's request. This function may be useful for Users who drive across state/country lines and are unfamiliar with the RRLC from the different states/countries. The system of the mobile application will have the User's driver license information as the User will enter and store the information of the driver license with the state/country who issued the driver license when registering a User profile. Using the location from where the User's driver license was issued with a User's current geolocation data, the system of the mobile application may send alerts for different rules or a summary of differing parking rules to the User according to the geolocation as it changes. Users may press a button on the display of the mobile application to view the summary of the different parking rules when comparing the location that issued the User's driver license with the User's current location. This method is not only applicable within the different states of the United States of America but also between different countries worldwide.

Since notifications are short and meant to alert the Users with quick summarized information about the potential parking violation, the User may utilize the forum function to obtain more comprehensive and detailed information from forum posts which includes but is not limited to inquiries, responses, discussions, pictures, videos, written descriptions, and any other information that may be posted. While reported ticket text information is used to generate/update the content appearing in notifications, all of information provided in ticket sharing will go to the ticket sharing forum (e.g. photos, videos, etc.). Users can access the forum and all its contents from the mobile application regardless of the User's current location while notifications may be displayed only when the User is approaching the specific location with previous issued parking violation citations. Information provided by Users in the forum may supplement and update information provided in notifications. The combination of receiving notifications and accessing a forum may provide more useful and extensive information for Users because notifications provide quick, time sensitive information while the forum provides the detailed, extensive information useful to gain full knowledge of the situation.

The forum functionality may incorporate two aspects: a forum which may be connected to the specific location of violations on the electronic map of the system of the mobile application or a general forum where Users may discuss general ideas not related to specific locations. The User can press on a location related to parking violations within the map display to choose "Forum," to access the forum function which may include different categories where information may be exchanged between Users, for example, tickets sharing; questions or answers or comments; parking signs; and/or other categories not included in the above, if any etc. The tickets sharing category may allow a User to view comprehensive, detailed information for the location applicable to the ticket violation including but not limited to a copy of the ticket without sensitive information; reasons for the violation; time of the violation; and an advisory to avoid the violation, etc. The questions or answers or comments category may allow a User to ask any questions, input any answers, and input any comments related to parking violations for the location in addition to viewing all this information contributed by other Users. The parking signs category allows Users to exchange information regarding parking signs. Other categories not included in the above may be added or deleted at the discretion of the Administrator of the system. When a User has an inquiry regarding parking violation related information for a location, the mobile application may allow the User to post using the forum function to obtain more information. The User inputted information may be open to comments and/or ratings from other Users. Comments with the highest endorsements may be given priority ranking for the position of the comment on a list. If endorsements reach a certain amount then the User may receive a credit or reward. The forum may allow other Users to provide various comments that include but are not limited to similar tickets and/or situations, dispute rates, and other information on whether a dispute may be successful based on provided circumstances from the User who received the parking ticket.

Users may use the forum to post a picture of a parking/street sign at a specific location and ask about the plain language of the sign. Users often experience difficulty in understanding parking signs, especially when there are multiple signs for different parking rules. In addition, many drivers may not have a strong command of the English language, which leads to further difficulties in interpreting the signs. Therefore, the mobile application may provide information in the forum on the specific location of the parking signs and translate these parking signs into easy-to-understand, plain English terms. Since some parking signs are confusing, Users may participate in redesigning them to make new designs. Users may create redesigns or translate traditional parking signs to different languages to be more understandable. Their design images may be subject to a rating system and the top design which generates the most positive ratings over a certain number after a certain amount of time may be rewarded. The top rated design may remain at the top of the list in the forum so other Users can view and easily understand the meaning of the signs.

The User may be allowed to do a general search for violations in the specific location within the forum or within the system. If the search does not result in an answer that satisfies the User, Users may have the option to post their own inquiry in the forum connecting to the specific location. By educating Users through sharing their own experience, other Users may be more conscious of their parking actions, which may help in the avoidance of receiving tickets and/or overall reduction of parking ticket violations. All functions of the mobile application, such as notifications and the forum for example, may be available in different languages that can be changed by the User. The system may use a third party service and/or API, for example, Google Translate™, which is a language translation service provided by Google Inc., or the Administrator of the system may hire professionals with expertise in parking violations and also competent translators to translate the content to different languages or provide explanations in plain English. Users may also translate information, which may be subject to ratings, in exchange for rewards.

The system of the mobile application may also connect to a third party electronic map, for example, Google Maps™, which is an electronic mapping service provided by Google, Inc., etc., to provide a street view function in the forum for places where there may be patterns of high ticket occurrences. Other media, for example, photos, videos, etc. for the location may also be provided by Users or employees of the system of the mobile application. This is especially useful for those locations with certain violation patterns where more information should be provided or for those locations where a User may be unfamiliar with to allow Users to better understand and avoid violations. User's privacy or the public's privacy will be protected when uploading photos, videos, etc.

In addition to other indicators, notifications may be sent based on violations with time restrictions. Time restrictions may be a time frame where parking is not allowed within a certain location, which may be used to help the system produce time sensitive alerts when applicable. The data may reflect an accurate time frame for these violations rather than track each time as its own specific instance of a violation and may notify Users about the entire time frame when parking is prohibited, and not just a specific time point as indicated on the ticket.

Time frame data may be applicable to several situations: for example "No Standing Anytime" where the time frame would need to indicate 24 hours, so any User whose geolocation data shows they are in a No Standing Anytime zone will receive a notification at any time. This method may also be applicable to alternate-side parking, for streets that do not allow parking during certain times due to government street cleaning services, which for example is usually applicable for half an hour (e.g. 9 AM-9:30 AM) or temporary tow zones notices, which for example is usually applicable for a day or a few days. The system may connect with the internal clock mechanism of the mobile communications device to send an automatic notification, reminding the User to move their vehicle due to street cleaning rules.

Although government websites may provide information on locations and the applicable rules for parking signs, the data might not be complete or may be unavailable.

Therefore, the system allows for User reporting of parking sign information, which may be used to generate notifications. The system may also allow Users to update parking restriction conditions to indicate for example, the condition has moved, and/or been removed temporarily/permanently, etc. The government agency or law enforcement agency, such as the police department may release information on their websites or post a temporary notice on the street regarding a temporary notice of "No Parking" areas on certain streets for certain time. Temporary notices also include no parking notices due to some special events, for example gatherings, road repairs, movie productions, etc. However, people might not know of or may not necessarily see these notices posted on the parking sign or the notices may not readily be apparent when a User parks his/her vehicle and should be notified by the system of any applicable temporary notices for these reasons. When a User discovers the information, the User can report the notice to the system and upload a picture of the notice, whereby the system may apply the stated parking rule to the whole street. As a result, Users who have parked their vehicle on the applicable street during the applicable time frame and/or distance frame restrictions or who have indicated in the settings that they want to receive notifications for any temporary notices on the street may receive a notification. The mobile application may prevent these Users from receiving a ticket or be towed away since the notification may warn the User of the temporary notice. This reporting method may also be applicable to other situations where any RRLC may be updated if the system does not detect it by itself. Users may submit and upload any relevant information through various media that include but are not limited to: photos/images from cameras/sensors, videos, hand drawn pictures, written descriptions, and any other mediums to accurately describe the situation for the location. To encourage Users to report the discovery of any changes in RRLC, the system may provide incentives where Users may earn rewards. The Administrator of the system may also hire employees or third party contractors to report the temporary notices so alerts may be sent to Users.

The method for recognizing the time frame may be used in combination with a distance frame to recognize certain distances where a User may incur violations. Parking violations are often due to parking outside a time restriction at a certain location. However, the time restriction may apply to a certain distance from one location to another. A ticket violation may apply for the whole street block, for example, "No Standing Anytime" does not usually just apply to the specific location where the User parked and may apply for a certain distance frame or the whole street block. Distance frame information may be inferred by using ticket information containing the violation code. Since violation codes may be different depending on the agency that issues tickets and collects ticket penalties, violation codes data input into the system may include violation codes from various agencies and/or statutory codes as they appear when written into law. For example, in New York City, a parking ticket may state the Department of Finance Violation Code as "14", which means "General No Standing: Standing or parking where standing is not allowed by sign, street marking or; traffic control device," and state "In violation of NYC Traffic Rules, Section: 4-08(c) No Standing." Accordingly, available parking rules data, for example, Chapter 4 Section 4-08 of Title 34 of the Rules of NYC and also Violation Code data from the Department of Finance may be entered into the database. The system may use these violation codes with the matching section codes and their respective meanings which are stored in the Unified Database to infer the time frame and distance frame to which the no standing rule applies as no standing is usually for 24 hours and may extend for a whole street block. If a User does not participate by reporting, then the Administrator of the system may hire an employee to physically inspect the location and verify the distance frame.

The system of the mobile application may use this information to accurately alert the User based on the vehicle's distance or time frame.

The system of the mobile application may alert the User when the User is parking in or near a tow zone area which include but are not limited to, private parking only, permit only, temporary road repairs, access for emergency services, and driveways which cannot be blocked. Other situations may include handicapped parking, reserved parking, parking permit only, and any other parking spaces designated for special purposes, wherein special purposes parking locations may be reported by interested individuals, Users, private entities, and the Administrator of the system who may also collect such information from different resources, for example various websites, etc. "No parking", "Tow away zone", "24 hours active driveway" etc. are usually indicated with lines, signs and/or words that state for example, "Tow Zone" or "Private Parking Only." People who are authorized to manage such spaces subject to towing can register towing information or Users can report this information, which will be used by the system to notify Users who are not authorized to park in the space at any time. Important towing information includes but is not limited to location of the tow zone, towing company name and telephone number, penalty for parking in the tow zone, and other relevant contact information. Drivers who illegally park their vehicles in a tow zone may be alerted about the parking violations and penalty through notifications. If Users park illegally and their vehicle has been towed, Users may check the parking location by pressing a button on the display of the mobile device to show the towing information such as the phone number, tow penalties, and other contact information if it has been registered by the people who are authorized to manage or access such tow zone space. The User may use this information to easily call to find out where the vehicle has been towed. This method saves both time and resources because Users are deterred from parking in the space if they know it is a tow zone and have information about the penalties. Tow zone areas may also be indicated on the map display through different colors to reflect that temporary parking is currently not allowed due temporary notices for example, a temporary tow zone notice for road repairs. Users may upload images of the posted temporary tow zone signs when they report the notice.

The alert system may include a server, database, and forum that receives and processes reports from Users' networked mobile devices. The system may process the information reported from Users who enter such information and upload images of their ticket violations. While ticket information may be processed and used to create/update notifications, ticket reporting from Users is also connected to the ticket sharing forum. After receiving this ticket, the User can open the mobile application and press a button to report the location of the violation. The User may identify the type of parking tickets to be reported from a menu of available pre-determined types. A multi-level menu system can be used to guide the User to a selection which identifies the type of possible ticket type. The server receives the report and the User's geolocation and determines additional contextual information that may be provided by the User and/or the User's mobile phone from the stored User profile. The system may also collect User supplemented information including, but not limited to, personal knowledge and/or ticket information with the time of the violation, the exact location as printed/written on the ticket, and the reasons for the violation, etc. Users may also be required to enter information such as photographs, videos, and written explanations to share their ideas on why the violation occurred in the form in connecting with the parking violation location.

There are usually two types of tickets: either a handwritten/machine generated ticket from a law enforcement officer or a machine generated ticket from a street camera image. Different law enforcement agencies may also use different forms for ticket violations. Any User reported information may include the information such as location, time, reasons, and also any suggestions, advice and/or solutions the User can contribute in order to share their knowledge to educate other Users to avoid the same type of violation again. The person who receives the ticket may be in the best position to submit suggestions, advice and/or solutions based on their personal experience.

The User may supplement reported information with photos of the location and any written explanations in addition to the photographs in the forum that is connected to the location of the violation. If the User takes a picture of the ticket to upload to the system database, the mobile application may allow the User to edit the image with an image editing function by covering/blurring information and/or sharpening the image prior to uploading the picture. Users may cover/blur parts of the images with sensitive information, for example name, plate number, or vehicle identification number etc. Using optical character recognition to sharpen blurry images increases the success rate for a computer to recognize the information in the image. As an alternative, the system may also allow a User to scan the parking violation citation by utilizing mobile device camera with scanner software downloaded into their mobile device.

Reported information may be subject to a review and/or ratings by the Administrator of the system and also other Users to ensure that credible information is being collected to provide notifications. Comments, suggestions, etc. may be listed in the forum according to ratings, and the ones with the highest amount of positive ratings will be listed at the top so other Users can clearly view the postings to gain the best knowledge. Users may be allowed to report to the Administrator of the system any information they may deem inaccurate. The Administrator of the system may be able to open a case where an employee and/or User may be sent to conduct an investigation of the purported inaccurate information to verify the quality of the information. Rewards may be provided for the User of the mobile application who may have assisted in the investigation.

The invention may therefore provide an informational and educational function, where the system of the mobile application provides notifications that will give specific reasons and suggestions on how to avoid the same violation and displays the historical summary of the violation to persuade the User to not take a chance at parking in a location with parking violations and so the User may know about the violation in advance.

The system may utilize an incentive method since the Unified Database incorporates crowdsourced data from Users. Crowdsourcing relies on the participation of a large amount of people who are incentivized for their participation. Basically, this incentive method allows Users to post and share their information in the mobile application to gain credit, which at a certain amount can be exchanged for the amount to cover the ticket received by the User. In this method, the User may be rewarded based upon the User's proactive effort to report their ticket information with efficiency, helpfulness, and accuracy. When Users receive tickets, they have the option to dispute or pay the ticket before the deadline. The User may be allowed to obtain endorsements for rewards after the ticket information is complete and submitted. When the User shares their ticket information as early as possible to gain payment, the User has a better chance of gaining more endorsements which may gain a reward to help pay the ticket violation. Additional credit bonus may be issued for Users who share their ticket information as soon as possible to send out the proper notifications to alert other Users. The User may be required to report and share all the information requested to qualify for the system to pay for his/her ticket and is also important because the User may receive endorsements from other Users based on the information.

A reward may be issued for the first User who reports ticket information at a location that has no prior ticket history of parking violations in the Unified Database. The maximum amount the User can receive is the total amount stated on the User's ticket or an amount that is set by the Administrator of the system according to the amount of positive ratings they have received for providing their ticket information along with comments and recommendations on how to avoid parking violation citations. Through rewards, Users may incur no losses from ticket violations and may also educate others to better comply with RRLC by sharing ideas to avoid future parking ticket violations. The reward system may involve several steps. In order to be eligible, the User may be required to be the first User to fully report the ticket information in detail for that specific location that did not have any prior ticket history by reporting the date, time from the issued ticket, with specific information on the reasons for the ticket and also must give beneficial suggestions, ideas, and/or advice on how to avoid the same violation. Only the first User who shares the full details of the ticket information and receives a certain number of ratings may receive a reward. Any other Users who try to report the same type of tickets at that location with the same reasons may be notified that they do not qualify for a reward that is the same as the first User. However, Users may be allowed to enter their ticket information if the ticket for the same location indicates different reasons/violations which may qualify for a reward. The mobile application may allow a User to take a photo of the ticket, which may be edited before submission as described previously. Each location may allow for the submission of one original ticket report which may allow one User to gain a reward. However, the administrator of the system may change the type of reward and/or amount of reward to different users who report parking ticket information by descriptions in different circumstances. For example, a reward for the first user may pay double amount of the reward or give a gift as a monetary reward.

For quality control purposes, the system of the mobile application may integrate a verification system. For rewards, the system may track ratings so that Users may only endorse one time for every ticket report. Additionally, the User may only rate the notification of potential parking violations if the User has personally experienced and received such notification when a User's geolocation is indicated to be within a certain radius of the location with violations which is the impact zone and generates the notification from the User who reported. Such Users who have received the notification based on their firsthand experience can either endorse (positive) or rebut (negative) when rating the notification.

Tickets issued by law enforcement officers may indicate a date which serves as the deadline for paying the ticket violation. As an incentive to Users, the system of the mobile application may use a method of rewarding efficient and useful reporting to help Users pay for their tickets through a reward system. Incentives are crucial to obtaining both an active participation from Users and also for obtaining accurate and truthful information. Active participation is important because statistical analysis depends upon a large group of data and it is important to continuously obtain real-time data of current situations.

Ticket violations are legal documents and may be subject to disputes. When a User may want to dispute the ticket violation, the forum in connection with the location of the parking citation may be useful because other Users may comment on their personal situations on whether a dispute is likely to be successful or meritless. The system may crowdsource within the forum for parking violation related dispute information from a plurality of Users in order to assist Users with useful dispute information. This dispute information may also be useful for Users who encounter a law enforcement officer and can use this information to discuss and explain the situation to them. The User may show the law enforcement officer that in fact, other Users who have received the specific parking ticket violation have disputed it in court and have won. The law enforcement officer, who is now informed of the situation, may or may not issue the ticket violation or may revoke the ticket violation as a result if the officer has the power to do so. This method may save Users money because if the dispute has merit as reported by others, the User may win the case. If the dispute does not have merit as reported by other Users, then the User may decide to just pay the fine and not dispute the ticket. Information related to disputes may be used to inform other Users of ticket dispute probabilities. The Administrator of the system may also hire professionals who may specialize in parking ticket disputes to assist in resolving dispute issues in the forum. The mobile application may allow a User to check dispute probabilities through pressing a button on the display that connects to the database of parking violation tickets received by other Users. Accordingly, Users may be educated on how to use legal remedies with efficiency.

The system of the mobile application may also educate Users on the process of disputing tickets if a dispute is meritorious. It is often the case that Users are unsure whether to dispute and how to dispute the ticket violation. The User may utilize crowdsourced ticket resolution information from other Users to find out whether their ticket may have a good chance of being dismissed if disputed based on information submitted by other Users. The dispute procedures may include information on the types of evidence that may be collected and submitted to the proper authority who adjudicates the dispute. The User may also be allowed to search and connect with third parties, such as lawyers who have registered with the system and who are experienced in disputing ticket violations, whereby the mobile application may allow the User to email pictures and other types of documents to the third-party directly from the mobile application. The mobile application's forum functionality may also allow Users to share information on their hearing and results of their hearing for their tickets. Other Users may use this information as a reference for future hearings since Users may be able to see other Users who may have gotten the same type of ticket in the same location for the same reasons. The system may also use this information to conduct analyses on locations that may have unusual ticketing activity to initiate guidelines to the Users.

The mobile application may alert the User to avoid the parking violation ticket by notifying the User through email, text message, phone call, phone alert, voice mail etc. automatically at the choice of the Users who set this in advance in the settings of the system. Functionalities within the system of the mobile application, notably the User reporting function, may connect to third party APIs to provide voice-to-text capabilities. Users who utilize the voice-to-text function may record their voice by speaking their statements into the microphone of the mobile communications device, which the system may change to text within the mobile application. Accordingly, Users may not necessarily have to enter information manually and may submit information to the system by recording their voice statements.

When the system is in operation, it may track the geolocation of each individual User while driving, along with the User's speed, in which a slow speed of 1-3 mph, for example, may be indicative of the intent to park within a certain radius of the intended destination as preset by the User. Based on the User's geolocation and speed, the system may send an inquiry to the User and ask for example, "Parking?" If the User chooses "Yes" then the system may notify the User of any parking violations within that location. To generate a notification, the system may query different data sets within the unified database for example, any historical citation information currently available; RRLC applicable to the location; any administrative notices or temporary notices applicable to the location, etc. If the User does not respond to the alert after a certain time, for example, 3 seconds then the inquiry may disappear automatically. The User may receive an inquiry for the intent to park only when the User's geolocation is within a certain radius of the intended destination, which may be a certain number of feet as set by the User. The User may also set the amount of instances, for example once, twice, or no notification, etc. they would like to receive an inquiry for the intent to park within the radius. If the User does not respond to the notification, the system may stop sending the notification after it reaches the number of instances previously set by the User. After this, the User may press a button on the display if they would like to view the potential parking violation notification information for the current location. Since the system integrates a road map in the database, if the vehicle slows down or stops in the middle of the road due to traffic or other reasons, or is outside the radius of the intended destination, the system may recognize such location through the geolocation GPS coordinates and speed data, and will automatically know not to send the intent to park notification since parking is not allowed in the middle of the road because it will block the street. The alert may appear on the display of the mobile device or may include the option for a voice alert.

Exemplary embodiments of the system may also connect with third party weather API's to retrieve historical weather information for the specific location to predict future parking situations where weather may have an impact on parking violations based on indications of increased parking violations during certain weather conditions. During similar weather circumstances the system may notify the User of any parking restrictions which may apply in the location where the User may intend to park. For example, if the system detects through the weather API and geolocation that the User intends to park in a location subject to any expected snowfall or floods, it will compare this information to the historical parking violation data within the database to find out if there may be any weather-related parking restrictions and increasing number of parking violations in the location which may be applicable to the User. Users may receive notifications when the weather forecast is similar to situations from historical data that reflect an increase in the number of violations for a certain area due to the same weather conditions. For example, the historical data for a certain location showed an increase in parking violations when there is snowfall. The historical data shows the increase in parking violations was a result of the snow covering up a hydrant, leading drivers to believe they can park in the location since they cannot see the hydrant. Accordingly, if there have been previous violations due to specific weather-related reasons, the system may direct the User to drive to an alternative parking location to avoid potential parking violation citations.

Exemplary embodiments of the present invention can be integrated with in-dash systems to enable the system to fully function within a vehicle. This integration is not limited to in-dash systems and may also be integrated in the vehicle by original equipment manufacture or a third-party add-on equipment that may be mounted within a vehicle. Exemplary embodiments for direct integration of the disclosed parking space information system into the navigation and GPS System in an onboard computer of original equipment manufactured vehicles. In such embodiments the disclosed architecture can be integrated directly into a vehicle's computer system.

When integrated into an in-dash navigation system, the vehicle's display may be used to show parking alerts in accordance with exemplary embodiments of the present invention as described above. The in-dash integrated system embodiment can provide remote updates and communications to the User through the installed disclosed violation related information and parking violation avoidance application on the User's mobile device to alert the User for example, when the parking time limit is approaching expiration, impending street cleaning or other temporary restrictions. When a User arrives at a parking spot, the system may detect the vehicle's location and may send a notification to a User's device to remind the User about the approaching parking meter expiration when applicable in addition to other relevant restrictions.

Integration may include utilization of vehicle equipment, for example speedometer, accelerometer, cameras, inertial sensor, gyroscope sensor, GPS sensor, and any other applicable equipment, etc. Utilization of this vehicle equipment may be used to obtain comprehensive real-time and historical activity information about the vehicle, for example its direction, speed, orientation and acceleration, etc. in order to issue applicable alerts to Users.

Exemplary embodiments of the present invention may be used by members of the general public and/or computer systems which includes but is not limited to: professionals, civilians, vehicles, websites, robots, in-vehicle systems, Global Positioning Satellites (GPS), and/or other systems. It is also intended that exemplary embodiments of the present invention may be used not only within a mobile device application of a mobile device, which may include primarily of smartphones, tablet computers, laptop computers, in-dash vehicle systems, etc., but may also be enlarged to encompass other systems or services which may process, utilize, and display the parking violation-related data, for example, exemplary embodiments of the present invention may contribute to the field of information services for online mapping companies and global positioning system (GPS) manufacturers, smart phone/mobile device manufacturers, wireless service providers, mobile application creators and developers, and mobile operating system developers and distributors, automated vehicle systems that do not require a physical driver in the vehicle etc.

In the description of the figures below, it is understood that the details described above may be combined with, or may be used in place of similar attributes described below and that the figures are used only to illustrate particular the invention. It is to be understood, that for the purpose of providing simplified figures that are easy to understand, many of the details above have been omitted from the figures, however, it is contemplated that the details described above may be incorporated into the approach of the description below in any feasible manner.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

FIG. 1A is schematic diagram illustrating a system for using data from the unified database to alert drivers of parking violation occurrences in accordance with exemplary embodiments of the present invention. The central computer system 100 may be the primary computing entity for performing the method described herein. The operative server 101 may be instantiated as one or more server computers and/or virtual machines that may work together to collect the parking violation data from a plurality of sources, to determine when drivers warrant alerts, and to provide the drivers with the alerts, when warranted. The operative server 101 may accomplish this by accessing parking violation data from data sets in the Unified Database 102. Non-real time crowdsourced data is historical data. The central computer system 100 may periodically access the data sets in the Unified Database 102. Alternatively, the central computer system 100 may access the data set of historical and real-time violations in the Unified Database 102 using specific APIs, by subscription, or by being pushed this data as it is made available.

The central computer system 100 may also collect parking violation data through one or more Users via real-time crowdsourcing. The central computer system 100 may parse the historical and crowdsourced parking violation data to understand its contents in a standardized and unambiguous manner.

The central computer system 100 may generate separate notifications for Users of commercial and non-commercial vehicles.

The Users who provide the crowdsourced data may, in addition to providing the data, access the central computer system 100 to pay parking violation fines. The central computer system 100 may connect to a ticket payment API 107 to facilitate this payment, where such a ticket payment API 107 is provided by the ticket issuing entity.

While the Users above provide the crowdsourced parking violation data, other Users, who may be referred to herein as, may make use of the parking rules as they drive in their vehicles 105 by interacting with the central computer system 100 via a mobile device communications unit 106 that is carried by the driver or installed in the vehicle 105. The communications unit 106 may communicate with a network of communications base stations 104 and may interact with the central computer system 100 via the Internet or other wireless connections 103.

Figure 1B:
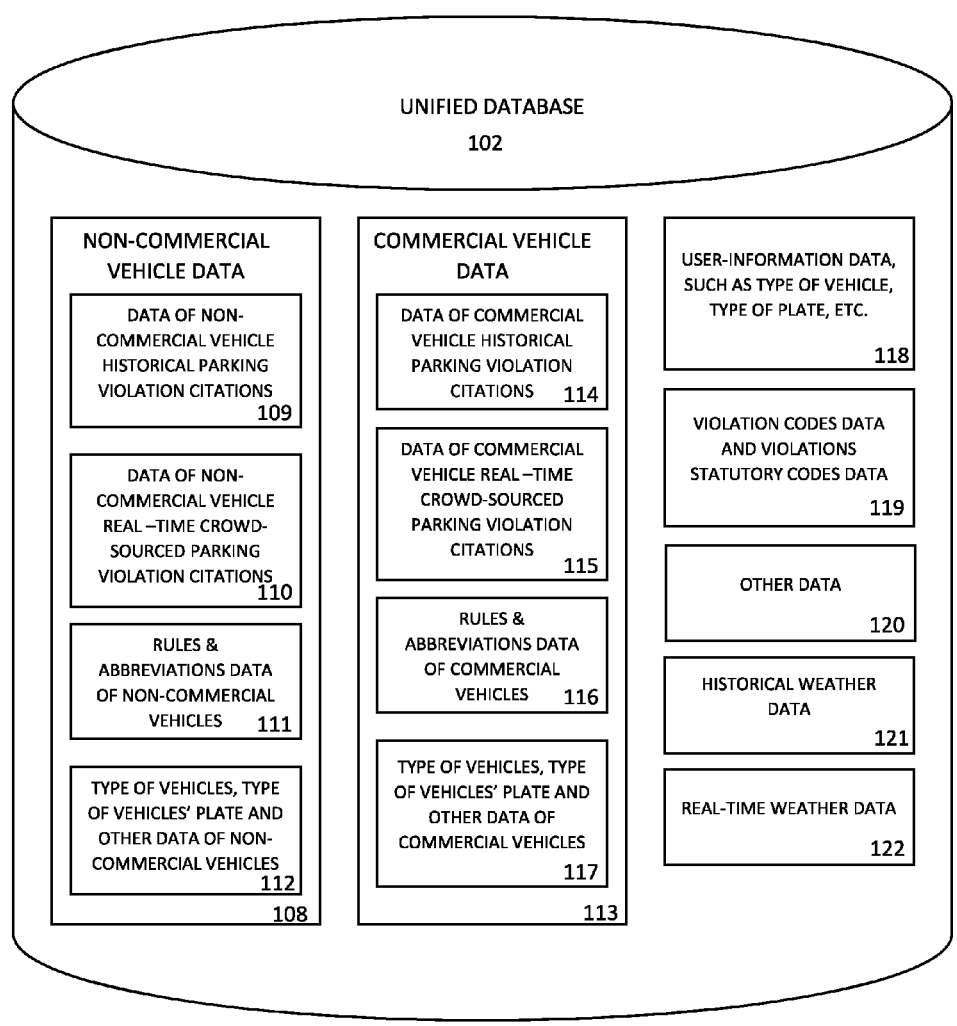
FIG. 1B is a diagram illustrating a Unified Database in accordance with exemplary embodiments of the present invention.

FIG. 1B is a diagram illustrating a Unified Database in accordance with exemplary embodiments of the present invention. Data sets are categorized according to non-commercial vehicles data 108 and commercial vehicles data 113 in the Unified Database 102. Non-Commercial Vehicles Data Set 108 includes non-commercial vehicles historical parking violation citations data 109, non-commercial vehicles real-time crowdsourced parking violation citations data 110, non-commercial vehicles parking rules and abbreviations data 111, and other non-commercial vehicles data relevant to non-commercial vehicles data 112, such as type of vehicles, type of vehicles' plate and other data related to non-commercial vehicles. Commercial Vehicles Data Set 113 applies to commercial vehicles only that includes type of vehicles, type of vehicles' plate and other data related to commercial vehicles, which includes commercial vehicles historical parking violation citation data 114, commercial vehicles real-time crowdsourced parking violation citations data 115, commercial vehicles parking rules and abbreviations data 116, and other commercial vehicles data relevant to commercial vehicles data 117. The central computer system 100 may retrieve data stored in User-information data 118 that includes User-information data, such as type of the vehicles, type of plates, etc. Additionally, User-information data set 118 is also used to store User profiles, settings, preferences, User-input reliability and prevent system abuse.

Once standardized and made unambiguous, the central computer system 100 may interpret the parking violation data from the Unified Database 102 to understand a set of rules that appear to govern the enforcement of parking violations in a specific area. These rules may be mathematical functions that take as input, location, day and time, and provide as output, an indication as to whether the provided location, day, and time is associated with parking violations. These rules may be stored in a parking rules data set for non-commercial vehicles 111 and commercial vehicles 116. The non-commercial vehicles violation data set 108 and the commercial vehicle violation data set 113 may be retrieved to generate the corresponding notifications to Users. The parking rules and abbreviations data set for non-commercial vehicles 111 and commercial vehicles 116 may be retrieved to help standardize parking violation data, as this data may tend to utilize various abbreviations and jargon that may be particular to certain sources. A violation codes data set 119 may store violation codes used by law enforcement/authorities and their corresponding definitions. Other data 120 relevant to providing effective alerts may also be input into the Unified Database 102.

The Unified Database 102 may also include weather-related data to connect with locations containing violation data. Historical weather data 121 may connect to historical citation data to find existing information about the correlation between a certain weather occurrences and parking violations. For example, during snow emergencies, designated legal parking locations may be illegal due to emergency services necessary to remove snow, etc. Historical weather data 121 may connect with non-commercial vehicles historical parking violation citation data 109 and commercial vehicle historical parking violation citation data 114 to obtain correlation information, which may be used with real-time weather data 122 to determine if a notification will be sent to Users whose current location indicates the User may be subject to weather-related parking advisories.

Figure 2:
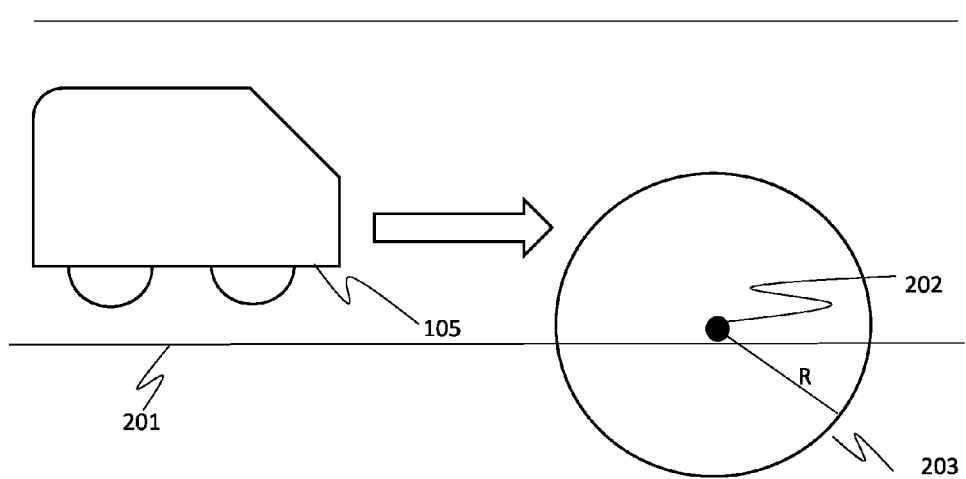
FIG. 2 is a schematic diagram illustrating an approach for alerting a driver in accordance with exemplary embodiments of the present invention.

FIG. 2 is a schematic diagram illustrating an approach for alerting a driver in accordance with exemplary embodiments of the present invention. The central computer system 100 may determine when the driver of vehicle 105 shows a parking intent through identifying the vehicles' speed and location. Then the central computer system 100 may provide the driver with a notification of potential parking violations when the vehicle 105 is within the impact zone 203 of a location when combined with a present local time and day, is associated with collected parking violation data and parking rules data stored in the unified database 102. The impact zone 203 may be determined according to a predetermined radius R about the location where the parking violation association has been made for geolocation 202 with previous parking violation data and parking rules. For example, the vehicle 105 may be traveling on a particular street 201. When the central computer system 100 detects a parking intent by identifying the current speed and location of the vehicle 105, then central computer system 100 may determine from the parking violation data and parking rules data stored in the unified database 102 if that location is associated with parking violations for the instant time and day. If it is so associated, any intent to park within this impact zone 203 may thereby generate a notification to the driver of the vehicle 105 from the computer system 100.

Figure 3A:
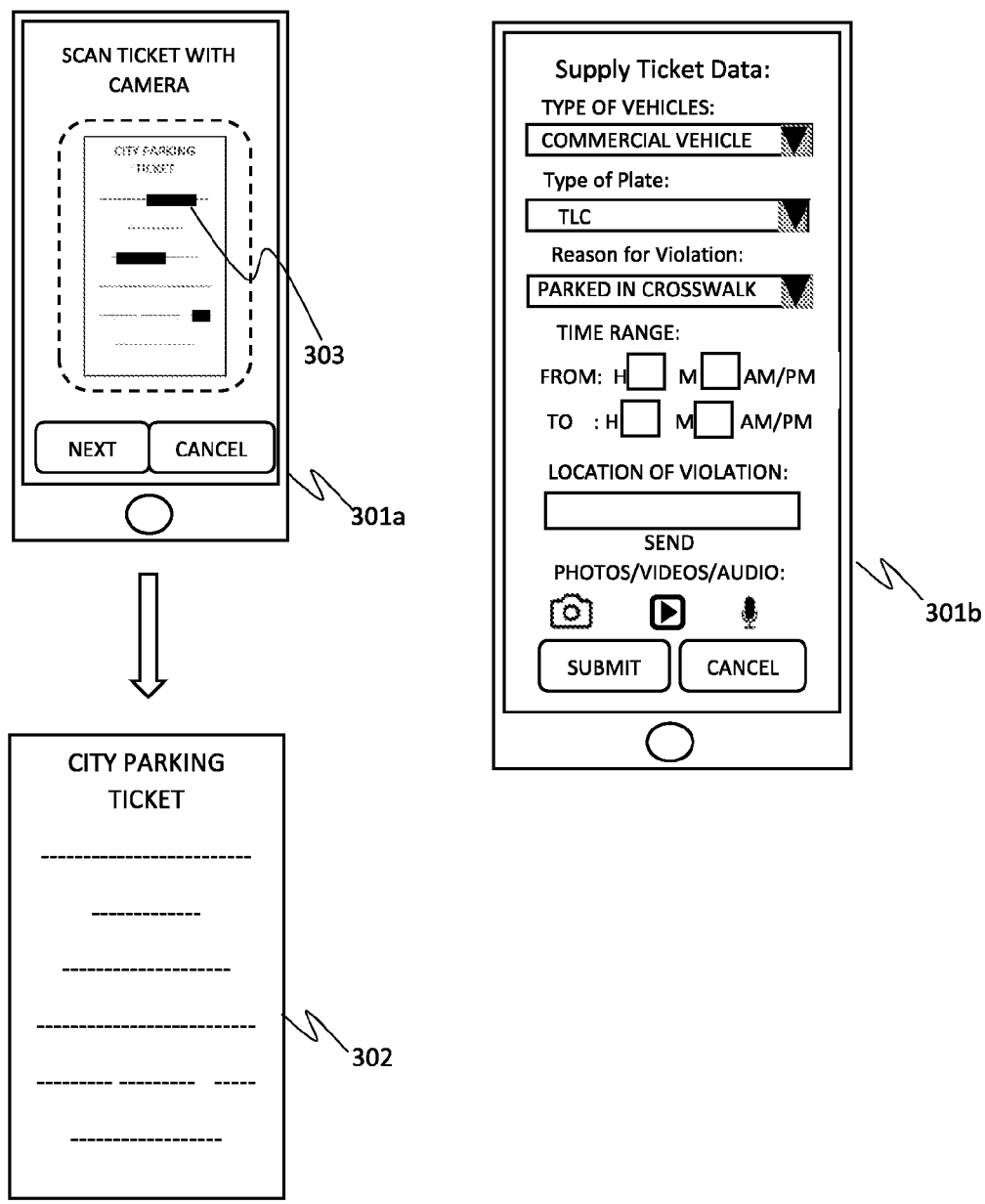
FIG. 3A is a schematic diagram illustrating a User's interaction with the central computer system using a mobile device when a User reports a parking ticket in accordance with exemplary embodiments of the present invention.

FIG. 3A is a schematic diagram illustrating a User's interaction with the central computer system using a mobile device when a User reports a parking ticket in accordance with exemplary embodiments of the present invention. For the purposes of this illustration, the User terminal 106 is depicted as a mobile device such as a smartphone 301a and 301b, however, it is to be understood that the User terminal 106 is not so limited, and it may be a vehicle integrated information/entertainment unit or any other computer device.

When a User is issued a citation for a traffic violation 302, the User may use the mobile device 301a to take a picture of the citation 302. As the citation 302 may include sensitive information such as the vehicle identification number (VIN) and other personal data, such as name, residential address, etc., the sensitive information may be redacted 303 either automatically by the mobile device 301a or manually by the User. Alternatively, the User may input the citation 302 information manually into the mobile device 301b, for example, by selecting from various drop-down menus and/or by entering it, and other information into free text fields. The User may also use the mobile device 301b to choose type of vehicle or type of plate, provide a photograph, a video and/or an audio message, which may be particularly useful when the User is driving. As described above, the drivers may receive alerts when parking.

Figure 3B:
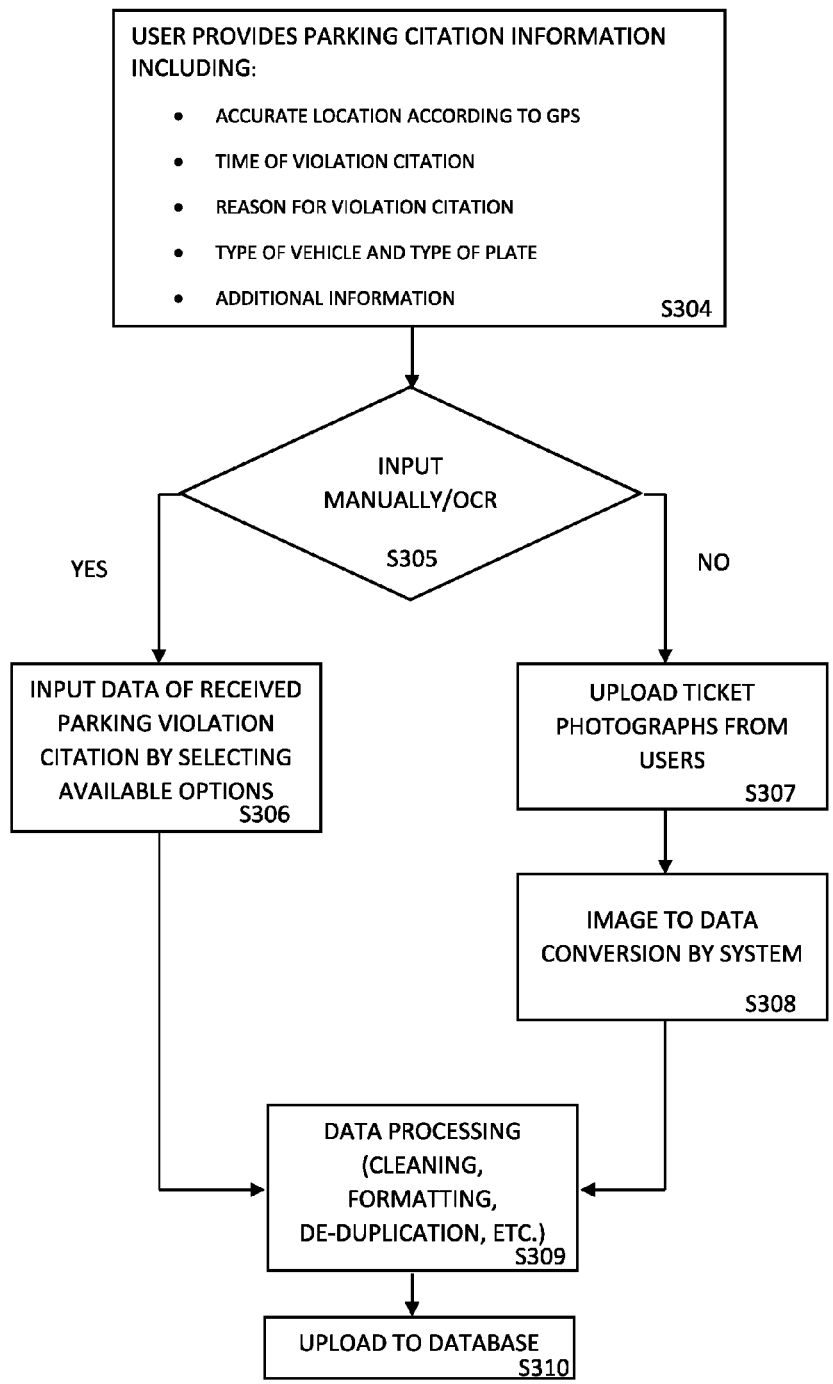
FIG. 3B is a flow chart illustrating how the parking ticket information reported from the User is recognized, processed and uploaded to the system.

FIG. 3B is a flow chart illustrating how the parking ticket information reported from the User is recognized, processed and uploaded to the system.

Users may provide parking citation information (Step 304) including but not limited to accurate location according to GPS, time of receiving violation citation, reasons for receiving violation citation, type of vehicle and plate, and any other additional relevant information, etc. Parking citation information may be input manually by the User or the system may perform optical character recognition to obtain the information (Step 305). Where input is manual (Yes Step 305), the User may input data of received parking violation citation by selecting available options (Step 306). Once all options are selected and other related information has been filled in, the data will be processed (Step 309) within the system through cleaning, formatting, and de-duplicating, etc. When complete, it will be uploaded to database (Step 310).

Where input is not manual, and is rather by OCR (No Step 305), Users may upload a parking violation citation photograph (Step 307), which will be converted to textual data in accordance with OCR techniques by an image processor (Step 308) to be processed (Step 309) by cleaning, formatting, and de-duplicating, etc. the data. Once the data is fully processed, it will be uploaded to database (Step 310). For example, there may be a type of violation that states "Taxi parked in an area only for commercial trucks for loading/unloading goods." The system may recognize the ticket and upload the data to the database with indicators that mark the ticket as a ticket only issued to non-truck vehicles.

Figure 4A:
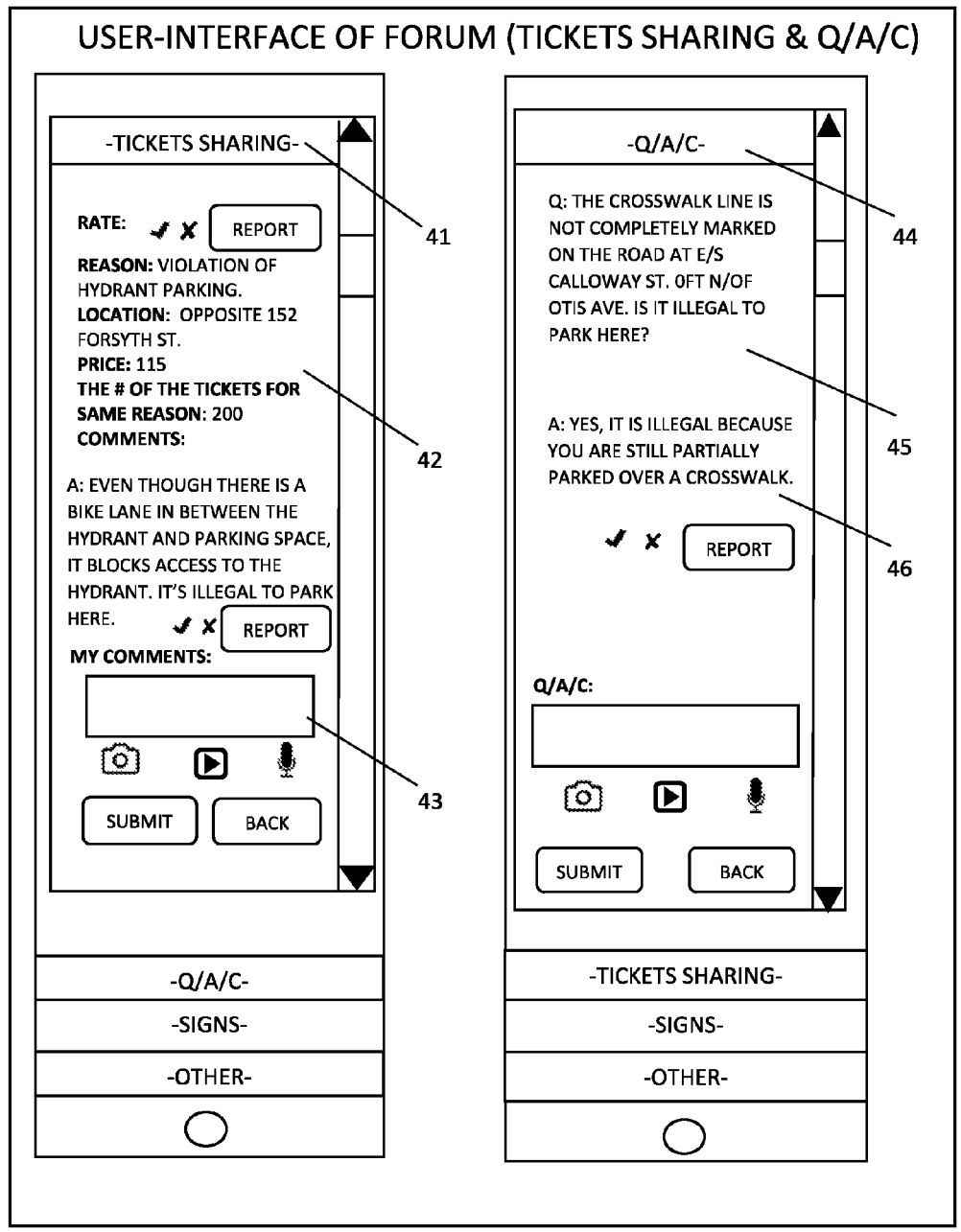
FIG. 4A is a diagram illustrating the User-interfaces (Ticket sharing & Q/A/C) within the forum based on a specific location in accordance with exemplary embodiments of the present invention.

FIG. 4A is a diagram illustrating the User-interfaces (Ticket sharing & Q/A/C) within the forum based on a specific location in accordance with exemplary embodiments of the present invention. When Users access the forum within the system of the mobile application, the User will have several options to choose from, such as Tickets Sharing 41 and Questions, Answers and Comments 44. Users may rate or report within the forum comment, view reasons, location of the violation, ticket penalty amounts, the number of tickets previously issued for the location 42. Users may also add their own comment 43 to the forum post while also submitting pictures, videos, voice recordings, etc. Users may also choose and submit questions 45, answers 46, and comments in the Questions, Answers and Comments 44 section of the forum.

Figure 4B:
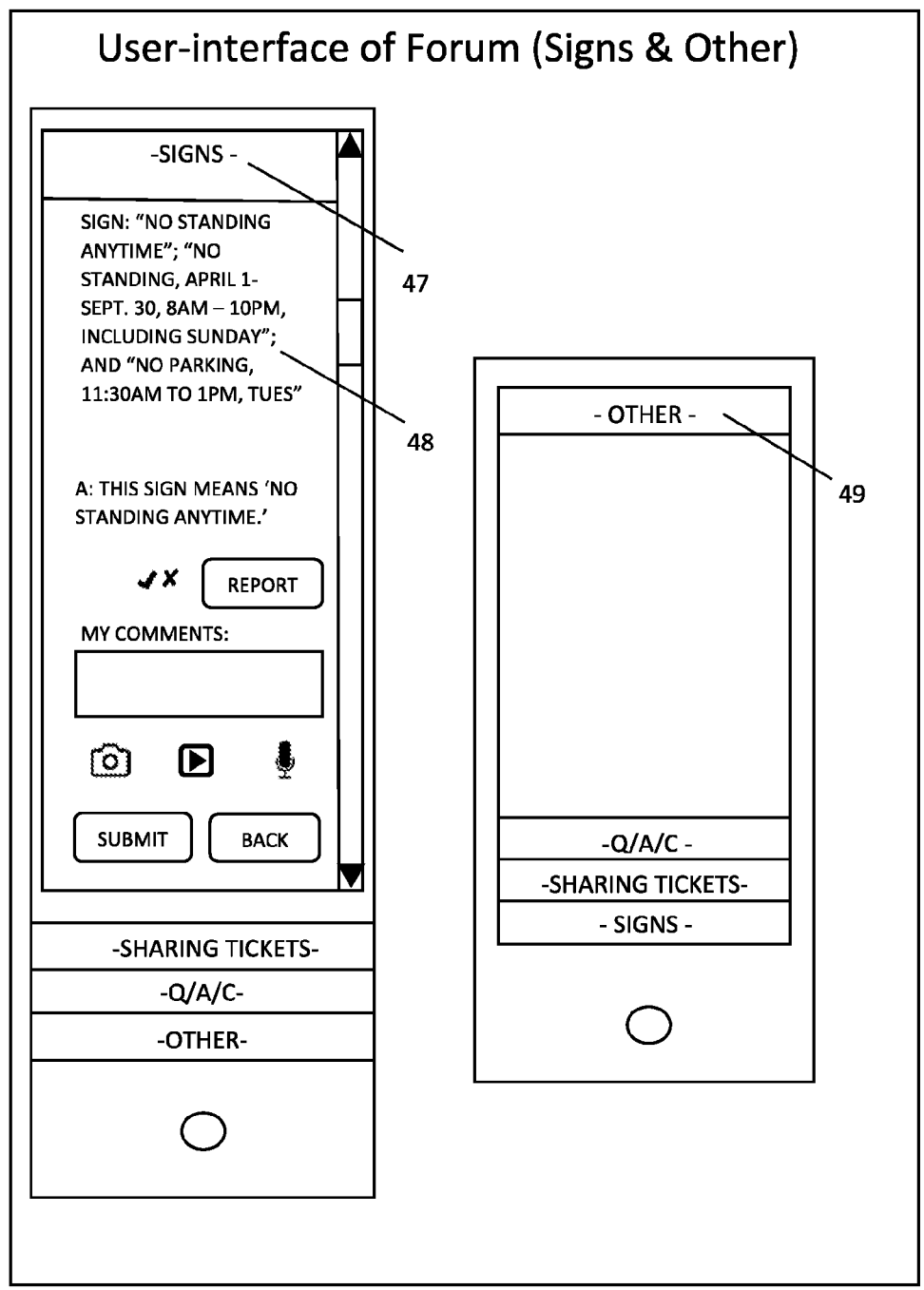
FIG. 4B is a diagram illustrating the User-interfaces (Signs & Other) within the forum based on specific location in accordance with exemplary embodiments of the present invention.

FIG. 4B is a diagram illustrating the User-interfaces (Signs & Other) within the forum based on a specific location in accordance with exemplary embodiments of the present invention. When Users access the forum within the system of the mobile application, the User will have several options to choose from, such as Signs 47 and Other 49 not included in the above, if any. The sign section 47 of the forum allows Users to view the content present on parking signs 48 reported by Users and comments from other Users regarding their interpretations of the sign. All comments or answers within the forum are subject to ratings. The comments or answers with the most positive ratings may be displayed at the top of the list. All comments and answers may be reported by Users and the Administrator can hire employees experienced in traffic laws to help Users resolve their concerns and provide professional answers. The forum may include other 49 categories as determined by the Administrator of the system.

Figure 5:
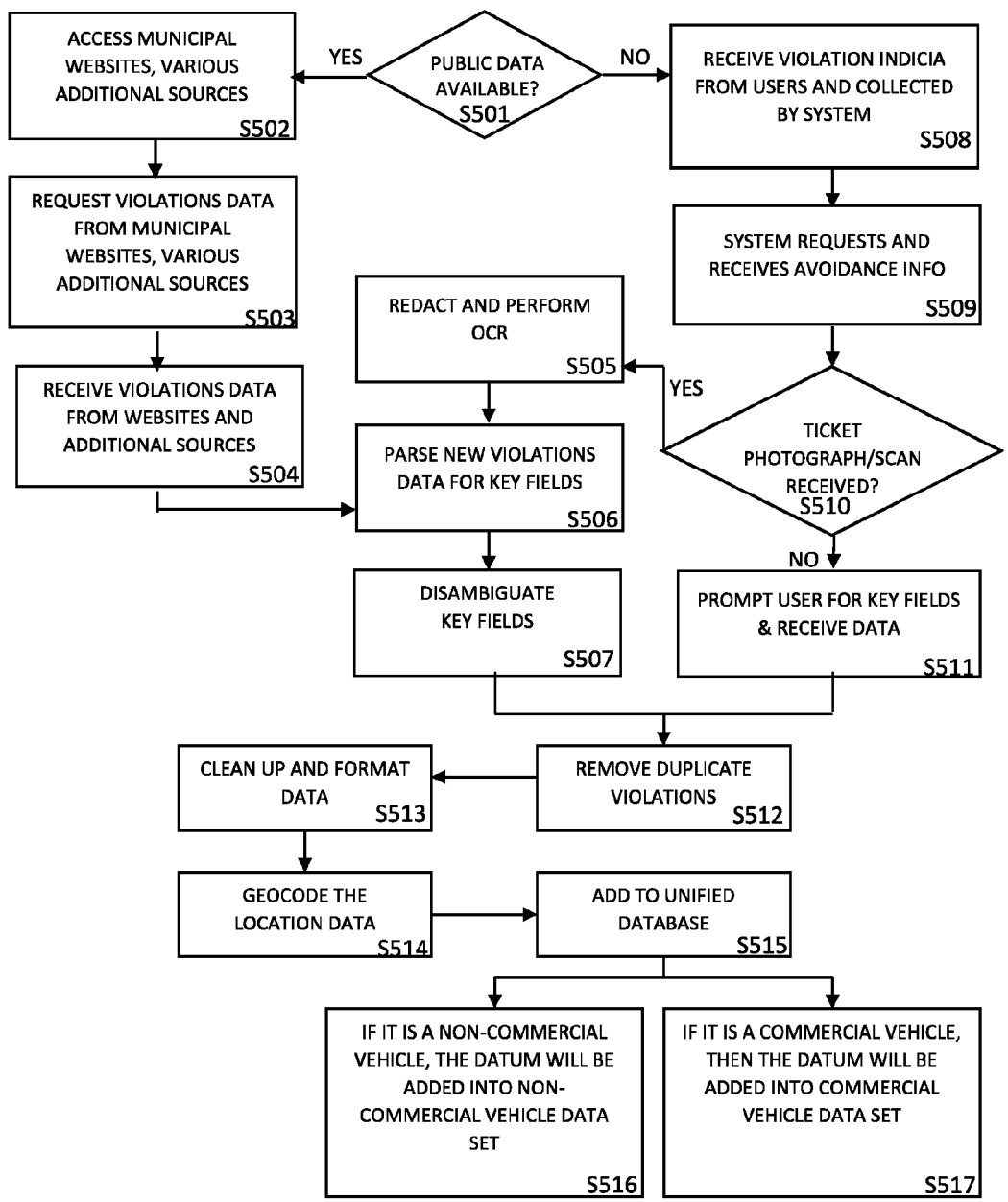
FIG. 5 is a flow chart illustrating an approach for processing parking data based on historical violation data and User crowdsourced data in accordance with exemplary embodiments of the present invention.

FIG. 5 is a flow chart illustrating an approach for generating parking rules data based on historical violation data and User crowdsourced data in accordance with exemplary embodiments of the present invention. As discussed above, information relating to parking violations may come from at least two sources: data collected from municipal websites and various additional sources for non-commercial vehicles 108 and commercial vehicles 113; User crowdsourcing data set for non-commercial vehicles 110 and commercial vehicles 115. If there is public data available (Yes, Step S501), municipal websites and various other additional sources may be accessed (Step S502). This access may be automatic and periodic. Once access has been established, violations data may be requested (Step S503) from websites and additional sources and the requested data may then be received (Step S504) from the websites and additional sources. As this data may be in a form that is dictated by the particular municipality, the received violations data may be parsed (Step S506) so that the various data and key fields may be understood.

As described above, parking violation data may originate from User crowdsourcing, so if there is no firm data publically available (No, Step S501), then an indicia of a violation may be received from a User (Step S508). These indicia inform the system that the User has received a citation for a parking violation and thus the process for collecting citation data may begin. During this process, the system may request, from the User, the pertinent citation data, as described above, as well as suggestions on how to avoid a citation (Step S509). A photograph of the citation may also be received by the User (Step S510). Where this photograph or scanned image is received (Yes, Step S510), optical character recognition (OCR) may be performed on the photograph image, which may have been redacted as described above (Step S505). Once OCR has been performed, the OCR text may be parsed for key fields (Step S506).

After the parsing of either the OCR data or the municipal data, key fields may be disambiguated (Step S507). It may be understood that in writing the citations, the same location may be described in many different ways. For example, the parking space may be referred to by the address that it is in front of, or, in some cases, across from. This address may also be provided in many different ways. For example, a single street may be written as "sixth ave," "6thave," "Avenue of the Americas," etc. Disambiguation therefore converts all data into a single format, for example, a location may be converted into latitude/longitude coordinates so that there is no ambiguity. Disambiguation may also be used to standardize violation names, for example, with reference to the abbreviation database 106 described above.

However, where the User does not provide a photograph or scanned image of the citation (No, Step S510), the User may be prompted to provide the pertinent data (Step S511), for example, in an unambiguous way such as by selecting from various options or manually typing into free-text fields and accordingly disambiguation might not be necessary in this case. In either event, the collected data may be de-duplicated (Step S512), cleaned and formatted (Step S513), geocode the locations (Step S514) to ensure that the same instance of a citation is not counted twice. This may be done, for example, with reference to a citation number that is specific to the issuing agency. Once the data is cleaned and formatted, it will be added to the violations data set in the unified database (Step S515). If the violation data is from a non-commercial vehicle, the datum may be stored in non-commercial vehicle data set S516. If the violation data is from a commercial vehicle, the datum may be stored in commercial vehicle data set S517. Data may include time, day, location-linked rules for commercial and non-commercial vehicles for determining when parking is problematic.

Figure 6:
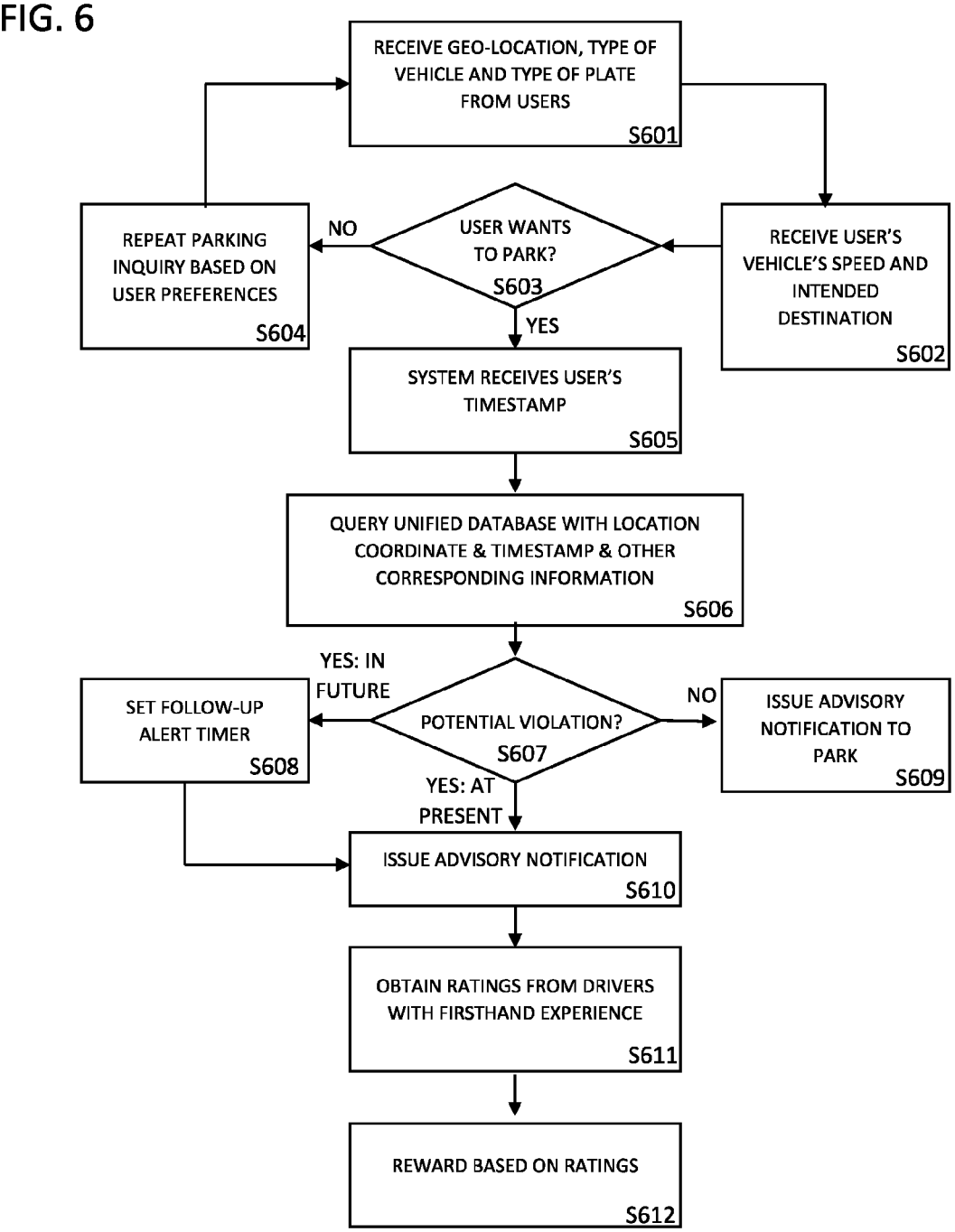
FIG. 6 is a flow chart illustrating a method and system to alert the Users based on the Unified Database in accordance with exemplary embodiments of the present invention.

FIG. 6 is a flow chart illustrating a method and system to alert the Users based on the Unified Database in accordance with exemplary embodiments of the present invention. The location coordinates of drivers may be transmitted to the system, for example periodically and the system may receive this coordinate data from the drivers (Step S601). The driver's current speed and intended destination may be received by the system from the driver's communication unit 106 (Step S602). The system may then query the User on the intent to park (Step S603). If yes, then the system may then determine the current time (Step S605). This determination may be made based on the communication unit 106 or computed by the system 100. If the system queries the driver (Step S603) and the User does not respond to the inquiry (No, Step S603) and has set up multiples instances the User would like to receive the intent to park query, the system will send the query based on the number of instances the User set (Step S604). The system will also continue to receive location coordinates from the driver (Step S601) and the vehicle's speed (Step S602) to determine the User's intent to park.

In the event that it is determined that the driver is parking (Yes, Step S603), the system may then determine the current time (Step S605). The Unified Database 102 may be queried (Step S606) to determine whether the driver's location and time corresponds to prior parking violations (Step S607). Where it is determined that the database does not contain data of prior violations for that location (No, Step S609), then the User may be notified that the User may park at that location. Where it is determined that citations have occurred at the location at the present time/day (Yes: at present S607), then a notification may be issued (Step S610). Where it is determined that citations have occurred at the location at a time/date in the near future (within a period of time that one is likely to be parked for) (Yes: in future S607), then a follow-up notification may be set by the User (Step S608) so that the User may be notified by the system (Step S610) to remind the User of the need to move his or her vehicle prior to the time or day in which parking violations have occurred.

The central computer system 100 may obtain ratings from drivers with firsthand experience (Step S611). Based on the ratings reaching a certain threshold, the system may reward those Users who contributed to the notification, which is partially based on User-reported ticket information (Step S612).

Figure 7:
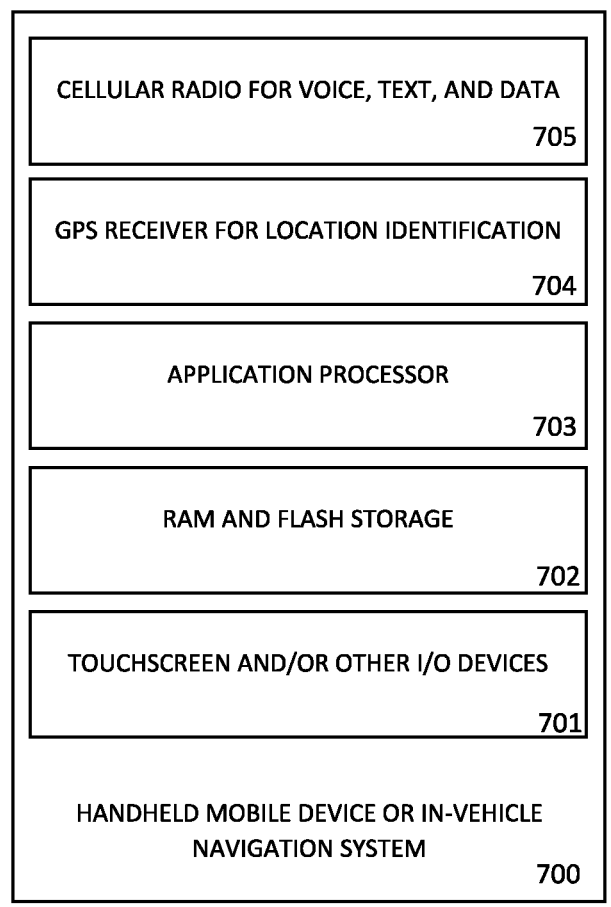
FIG. 7 is a schematic diagram illustrating the physical composition of a mobile device or in vehicle navigation system for reporting parking violations and receiving parking alerts in accordance with exemplary embodiments of the present invention.

FIG. 7 is a schematic diagram illustrating the physical composition of a mobile device or in vehicle navigation system for reporting parking violations and receiving parking alerts in accordance with exemplary embodiments of the present invention.

The handheld mobile communications device such as a smartphone or in vehicle navigation system 700 may utilize a cellular radio 705 for connecting to the central computer system 100 for example, over the Internet or other wireless connections 103. The smartphone 700 may include a GPS receiver 704 for identification of a present location. A mobile application processor 703 may be used for executing software, which is stored in RAM and flash storage/memory 702 to implement the methods discussed above. A touchscreen 701 and/or other I/O devices allow the driver/User to interact with the system. These other I/O devices may include a camera, a microphone, and/or a speaker for performing the functionality discussed above.

Figure 8:
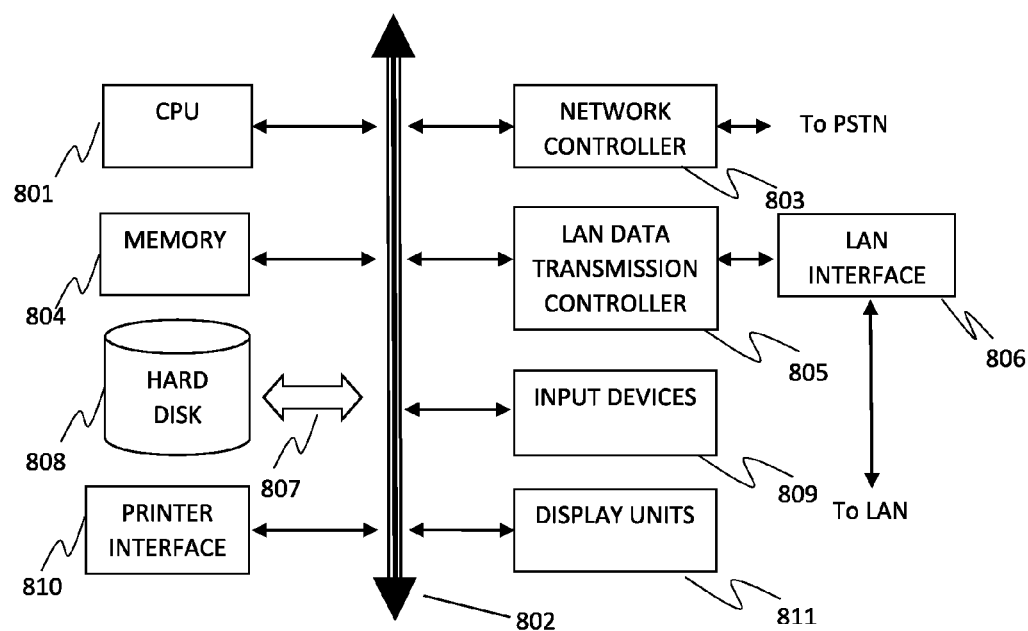
FIG. 8 shows the physical composition of a remote operative server that may implement a method and system of the present invention.

FIG. 8 shows the physical composition of a remote operative server that may implement a method and system of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The operative server referred to generally as server 101 may include, for example, a central processing unit (CPU) 801, random access memory (RAM) 804, a printer interface 810, a display unit 811, a local area network (LAN) data transmission controller 805, a LAN interface 806, a network controller 803, an internal bus 802, and one or more input devices 809, for example, a keyboard, mouse etc. As shown, the system 802 may be connected to a data storage device, for example, a hard disk 808 via a link 807.

Figure 9:
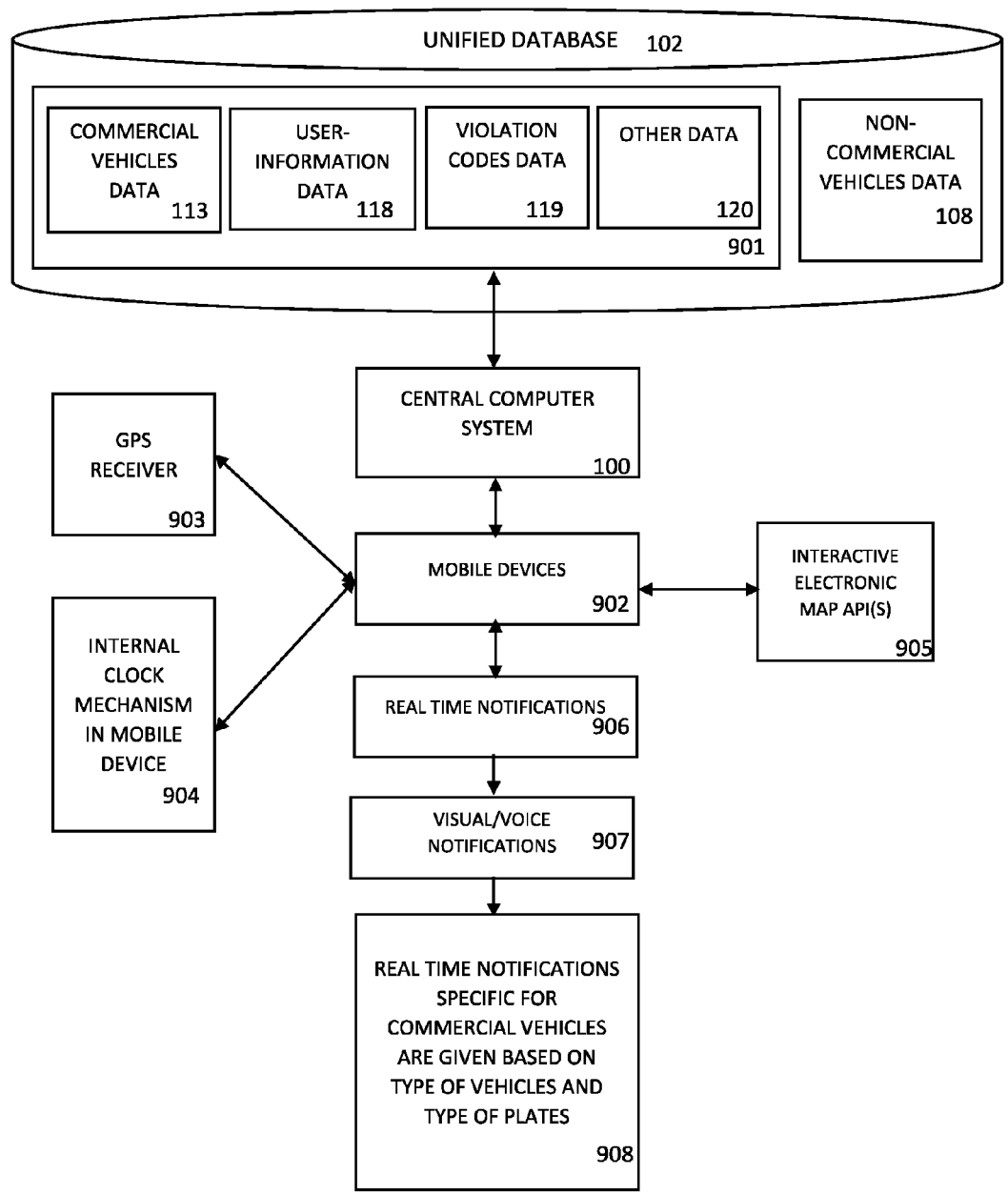
FIG. 9 is a schematic diagram illustrating a system and method for mobile devices and in vehicle navigation systems to connect with the system's Unified Database and generate corresponding real-time notifications for commercial vehicles in accordance with exemplary embodiments of the present invention.

FIG. 9 is a schematic diagram illustrating a system for mobile devices and in vehicle navigation systems to connect with the system's Unified Database and generate corresponding real-time notifications for commercial vehicles in accordance with exemplary embodiments of the present invention. The Unified Database for commercial vehicles 901, which includes the commercial vehicles data set 113, User-information data set 118, violation codes data set 119, and other relevant data set 120 will be used to generate notifications for commercial vehicles only. The mobile communications devices 902 generates the real-time notifications 906 through Interactive Electronic Map APIs 905, such as Google Map API, and through the central computer system 100 that connects to Unified Database 102, which includes the corresponding Parking information, RRLC information, comments from other Users, etc. from Unified Database for commercial vehicles 901, and based on the location information and date/time information that received from the GPS receiver 903 and internal clock mechanism inside the mobile communications device 904. Notifications specific to commercial vehicles 908 are given based on the types of vehicles and the types of plates, which may be delivered in two ways: visually and/or by voice 907.

Figure 10:
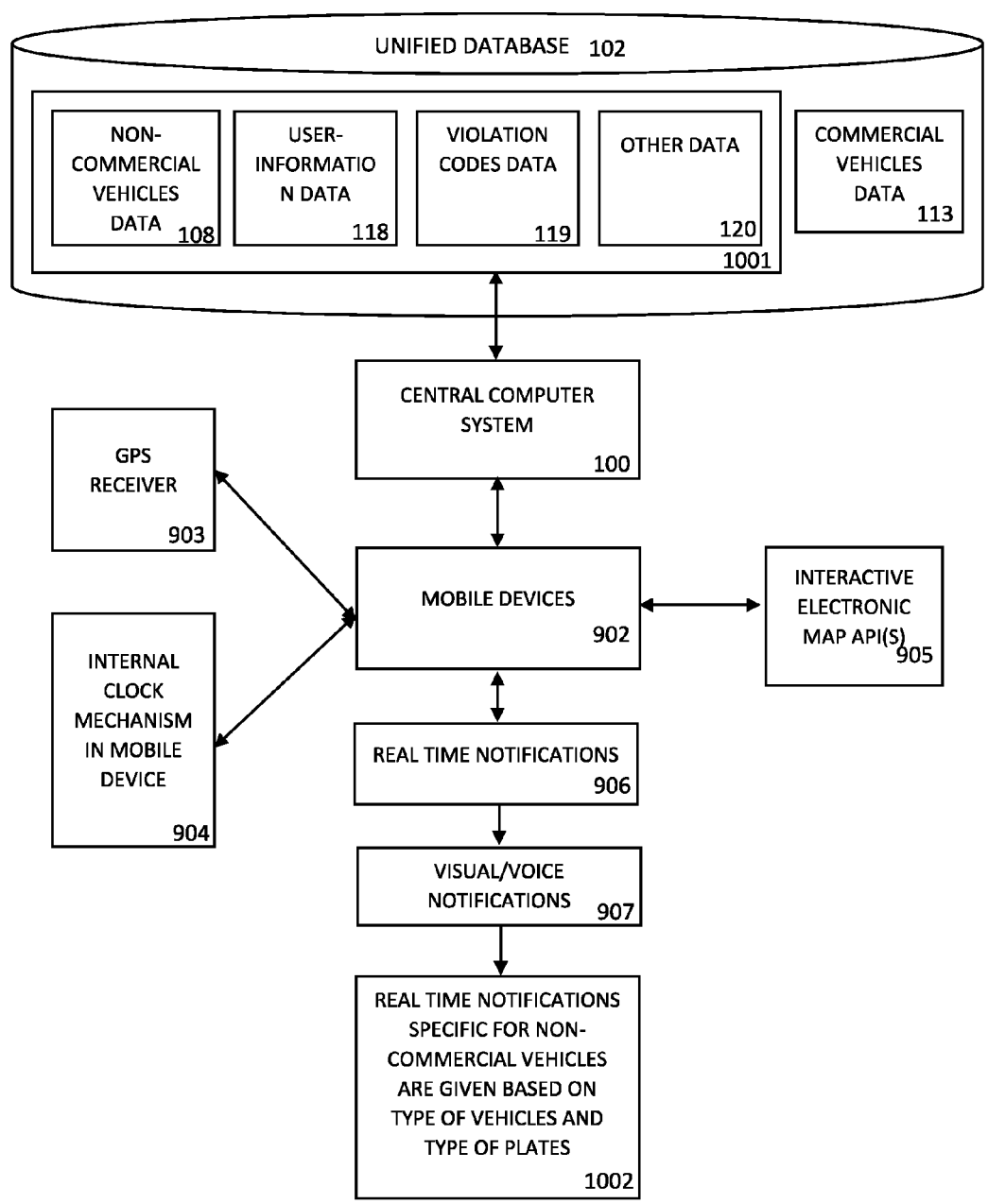
FIG. 10 is a schematic diagram illustrating a system and method for mobile devices and in vehicle navigation systems to connect with the system's Unified Database and generate corresponding real-time notifications for non-commercial vehicles in accordance with exemplary embodiments of the present invention.

FIG. 10 is a schematic diagram illustrating a system for mobile devices and in vehicle navigation systems to connect with the system's Unified Database and generate corresponding real-time notifications for non-commercial vehicles in accordance with exemplary embodiments of the present invention. The Unified Database for non-commercial vehicles 1001, which includes the non-commercial vehicles data set 108, User-information data set 118, violation codes data set 119, and other relevant data set 120 will be used to generate notifications for non-commercial vehicles through central computer system 100. The mobile communications device 902 generates the real-time notifications 906 through Interactive Electronic Map APIs 905, such as Google Map API, and through the central computer system 100 that connects to Unified Database 102, which includes the corresponding Parking information, RRLC information, comments from other Users, etc. from Unified Database for non-commercial vehicles 1001, and based on the location information and date/time information that received from the GPS receiver 903 and internal clock mechanism inside the mobile communications device 904. The notifications specific to non-commercial vehicles that are given based on types of vehicles, types of plates 1002 and address in description if applicable may be delivered in two ways: visually and/or by voice 907.

Figure 11:
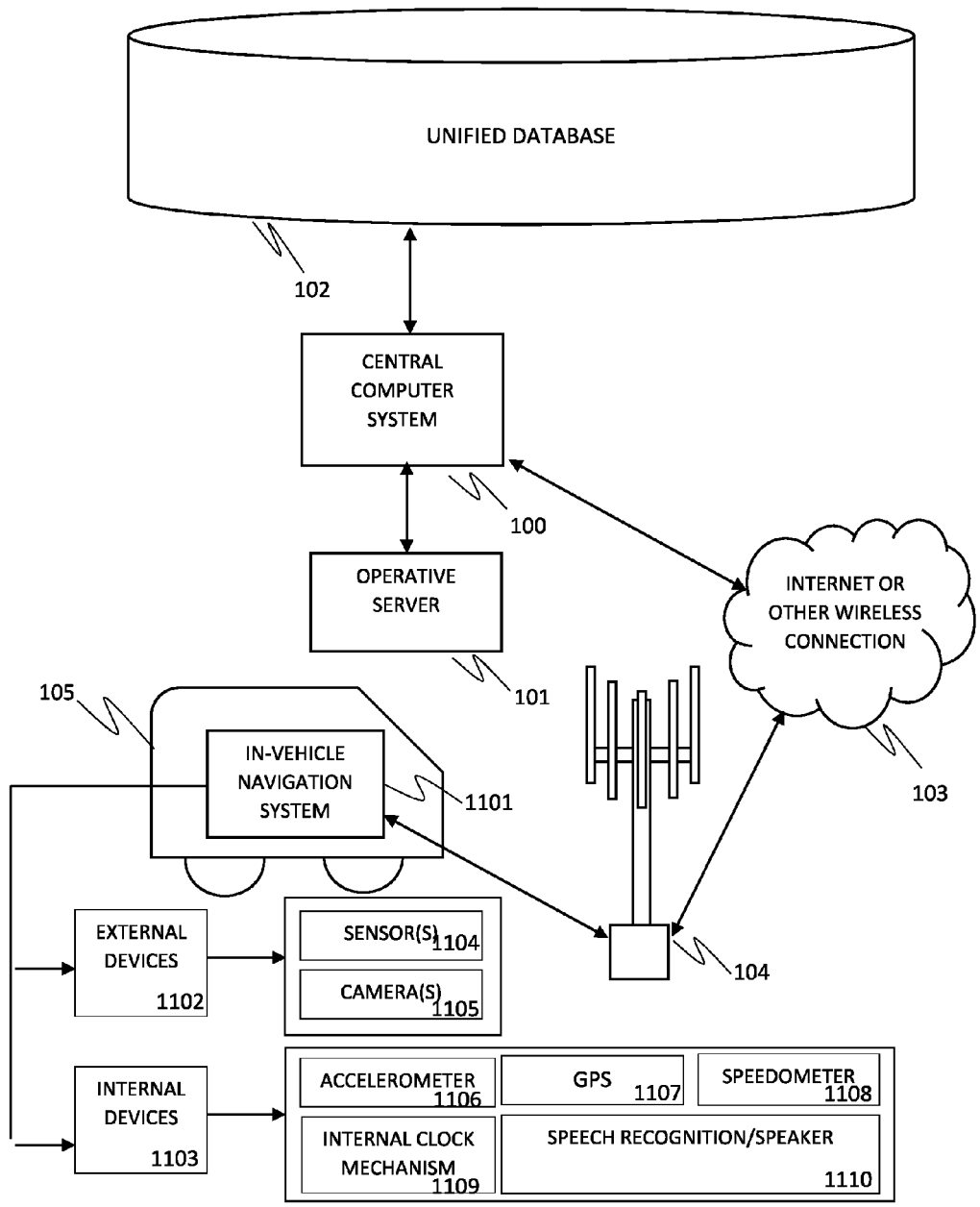
FIG. 11 is a schematic diagram illustrating a system for using the Unified Database to alert drivers of parking violation occurrences through an in-vehicle navigation system in accordance with exemplary embodiments of the present invention.

FIG. 11 is a schematic diagram illustrating a system for using the unified database to alert drivers of parking violation occurrences through an in-vehicle navigation system in accordance with exemplary embodiments of the present invention. The central computer system 100 may be the primary computing entity for performing the method described herein. The operative server 101 may be instantiated as one or more server computers and/or virtual machines that may work together to collect the parking violation data from a plurality of sources, to determine when drivers warrant alerts, and to provide the drivers with the alerts. The operative server 101 may accomplish this by accessing parking violation data from data sets in the Unified Database 102. Non-real time crowdsourced data is historical data. The central computer system 100 may periodically query the data sets in the Unified Database 102. Alternatively, the central computer system 100 may access the data set of historical and real-time violations in the Unified Database 102 using specific APIs, by subscription, or by being pushed this data as it is made available. In-vehicle navigation system 1101 consists of External Devices 1102 comprised of one or more Sensors 1104 and one or more Cameras 1105 and Internal Devices 1103 comprised of Accelerometer 1106, GPS 1107, a speedometer 1108, a clock mechanism 1109, and Speech Recognition/Speaker 1110.

For the connection with camera, it can be done by means of a USB cable and a hub or directly from the camera to the phone or by wireless connectivity such as by Bluetooth or other wireless connectivity solution.

The central computer system 100 may also collect parking violation data though one or more Users via real-time crowdsourcing. The central computer system 100 may parse the historical and crowdsourced parking violation data to understand its contents in a standardized and unambiguous manner.

The central computer system 100 may generate the notifications for non-commercial vehicles driver Users and commercial vehicle driver Users separately.

The Users who provide the User crowdsourced data may, in addition to providing the data, access the central computer system 100 to pay parking violation fines. The central computer system 100 may connect to a ticket payment API 107 to facilitate this payment, where such a ticket payment API 107 is provided by the ticket issuing entity.

While the Users above provide the crowdsourced parking violation data, other Users, who may be referred to herein as drivers (although both sets of Users are technically Users and drivers), may make use of the parking rules as they drive in their vehicles 105 by interacting with the central computer system 100 via an In-Vehicle Navigation System unit 106 that is carried by the driver or installed in the vehicle 105. The In-Vehicle navigation system unit 106 may communicate with a network of communications base stations 104 and may interact with the central computer system 100 via the Internet or other wireless connections 103.

Figure 12:
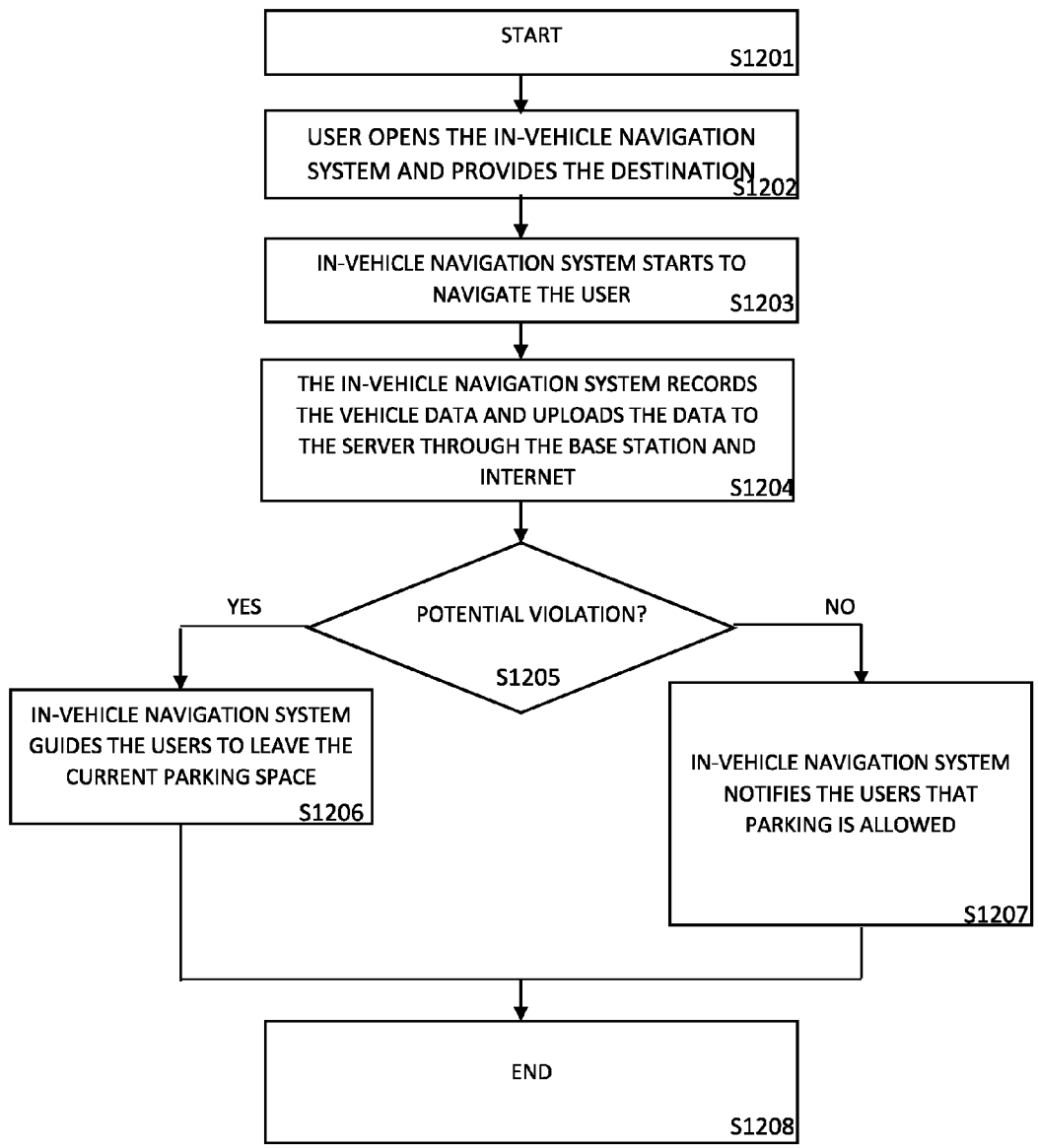
FIG. 12 is a flow chart that illustrates the workflow of how an in-vehicle navigation system works in accordance with exemplary embodiments of the present invention.

FIG. 12 is a flow chart that illustrates the workflow of how an In-Vehicle Navigation System works in accordance with exemplary embodiments of the present invention. When User starts to use the In-Vehicle Navigation System (Step 1201), and fills in the intended destination (Step 1202), then the In-Vehicle Navigation System starts to navigate the User to the destination (Step 1203). The In-Vehicle Navigation System also records the vehicle data and uploads the data to the server through the base station and Internet (Step 1204). When the vehicle is approaching a potential parking space, the system may detect the user's parking intent through the vehicle's speed and location proximity to the intended destination. The system will query the unified database to search for potential parking violations at the location where the user intends to park. If the system detects potential parking violations based on the unified database and geo-location of vehicle's current location (Yes, Step 1205), then the in-vehicle navigation system will guide the users to leave the current parking space by issuing an alert advisory (Step 1206). If there are no potential parking violations detected (No, Step 1207), then the system will issue an alert advisory stating it is legal to park in this location. The end of the process is achieved at (Step 1208).

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system with one or more computing devices comprising a wired or wireless source of communications, one or more memory units to memorize and store various data, and one or more processors coupled to said one or more memory units, wherein said one or more memory units instruct said one or more processors to map and store parking violation related data and notify a user on how to avoid receiving parking violation citations, said system comprising:
a clock mechanism to determine a present time and date;
a unified database comprising historical parking violation related data interactively correlated to real-time crowdsourced parking violation related data clustered into two data types consisting of commercial vehicle related data and non-commercial vehicle related data, said historical parking violation data comprising one or more of: parking rules, violation codes, one of more parking violation statutory codes or more abbreviations used by parking enforcement personnel, one or more associated fines or other penalties, one or more parking signs with one or more locations, one or more associated parking meter cost with parking meter locations, one or more notices for temporary or permanent parking prohibitions, one or more tow away zone locations, and one or more parking violations citation records;
a forum module for crowdsourcing said parking violation related data to assist said user in avoiding said parking violation citations;
a location determining apparatus to identify a current location of said user, wherein said location determining apparatus is connected to said unified database such that one or more notifications of parking related information corresponded to said current location and correspond to said user's type, wherein said user type comprises commercial vehicle user type and non-commercial vehicle user type;
a processing apparatus connected to said unified database to analyze said parking violation related data to predict said user potentially being in violation of one or more parking rules or regulations;
a display apparatus connected to said processing apparatus; and
a notification apparatus for generating a set of notifications of potential parking related violations, wherein said set of notifications of potential parking related violations are issued to said user based on said user type to which said user belongs.

2. The system of claim 1, wherein said unified database is populated by at least one of the steps of:
receiving said historical parking violation related data from one or more sources; and
receiving said real-time crowdsourced parking violation related data from said user.

3. The system of claim 1, wherein said one or more sources for said parking violation related data in said unified database comprise one or more government agencies, municipalities, non-government organizations, private entities, community organizations, interested individuals, websites and blog posts or social networks.

4. The system of claim 3, said one or more memory units instruct said one or more processors to interactively correlate said real-time crowdsourced parking violation related data with said historical parking violation related data comprising correcting, updating, and supplementing at least a portion of said historical parking violation related data dynamically.

5. The system of claim 4, said one or more memory units instruct said one or more processors to cluster said parking violation related data in said unified database into two data types: commercial vehicle related data type and non-commercial vehicle related data type.

6. The system of claim 1, said one or more memory units instruct said one or more processors to provide said forum module to collect said real-time crowdsourced parking violation related data by allowing said user to share and contribute parking violation related information.

7. The system of claim 6, wherein sharing and contributing parking violation related information comprises supplementing parking violation citation data not currently available in said unified database, redesigning one or more parking signs, or sharing one or more recommendations for avoiding parking violation citations.

8. The system of claim 6, said forum module comprising at least a general forum module and a specific forum module,
   wherein said general forum module allows said user to exchange general information regarding the avoidance of parking violation citations with one or more other users, and
   wherein said specific forum module is configured to:
   gather questions, answers, and comments about parking violation citations at one or more specific locations; and
   provide recommendations on how to avoid said parking violation citations at said one or more specific locations.

9. The system of claim 8, said specific forum module providing a street view function with one or more photos, videos and recommendations for avoiding parking violation citations for said one or more specific locations with a pattern of high parking violation citations.

10. The system of claim 6, said specific forum module further comprising a parking violation citation dispute module connected to said unified database and said location determining apparatus.

11. The system of claim 10, said one or more memory units instruct said one or more processors to provide said parking violation citation dispute module allowing said user to access information to evaluate the probability of a successful parking violation citation dispute,
   wherein said user seeks crowdsourced assistance from said one or more other users or seeks third party professional service for said parking violation citation.

12. The system of claim 11, wherein said unified database assists said user in evaluating said parking violation citation for said probability of a successful parking violation citation dispute.

13. The system of claim 6, said one or more memory units instruct said one or more processors to provide a parking signage database associated with said specific forum module for storing parking sign locations, images, or corresponding parking rules or regulations,
   wherein plain explanations of parking signage for one or more corresponding locations are provided.

14. The system of claim 13, said user sharing said parking signage for said one or more corresponding locations and contributing one or more redesigns of said parking signage.

15. The system of claim 6, said user rating said one or more recommendations for avoiding said parking violation citations and said one or more redesigns of said signage positively or negatively,
   wherein the highest rated said one or more recommendations for avoiding parking violation citations and one or more redesigns are displayed in order either at the top or at the bottom of said display apparatus.

16. The system of claim 1, wherein said one or more memory units instruct said one or more processors to:
   obtain consent from said user to access said user's parking violation related data from one or more government sources comprising at least a portion of: location, date and time of citation issuance, reason, issuing agency information, and other related data regarding one or more issued parking violation citations,
   wherein said user is notified about having any active parking violation citations; and
   provide a parking violation citation payment module for said user to pay fines incurred as a result of receiving said parking violation citation or otherwise dispute said parking violation citation.

17. The system of claim 16, wherein said parking violation related data obtained from said government sources collected by consent from said user is used to correct, update and supplement said unified database.

18. The system of claim 1, said one or more memory units instruct said one or more processors to process said parking violation related data from said unified database by performing the steps of:
   retrieving location, date, time, and one or more violation codes of each of the issued parking violation citations for commercial vehicle related data or non-commercial vehicle related data from said unified database;
   retrieving said one or more parking violation statutory codes or one or more abbreviations used by parking enforcement personnel in each said parking violation citation for commercial or non-commercial vehicles from said unified database;
   deciphering one or more parking violation codes or parking violation statutory codes in each issued parking violation citation for commercial or non-commercial vehicles retrieved from said unified database and correlating one or more deciphered parking violation or parking violation statutory codes with one or more parking rules or regulations from said unified database; and
   clustering said parking violation related data from said unified database according to one or more locations, dates and times of violation issuance, and one or more reasons for violation issuance.

19. The system of claim 1, wherein said notices for temporary or permanent parking prohibitions in said unified database further include at least one or more fines or other penalties associated with one or more parking locations and one or more parking times or parking time intervals.

20. The system of claim 19, said notices for temporary or permanent parking prohibitions in said unified database further comprise one or more tow away zones, whether temporarily or permanently enforced, comprising:
   one or more locations where a vehicle will be towed away;
   specific time or time interval when at said one or more locations a vehicle will be towed away; and
   information related to public and private tow away zones along with contact information regarding towing companies, fines and other penalties associated with said vehicle being towed away.

21. The system of claim 1, said one or more memory units instruct said one or more processors to cluster users into two sets of user types: commercial vehicle user type and non-commercial vehicle user type.

22. The system of claim 1, said display apparatus is equipped at least with:
   a display to display one or more notifications; and
   one or more sensors, one or more accelerometers and one or more GPS devices to identify said user's parking intent.

23. The system of claim 22, said one or more memory units instruct said one or more processors to identify said parking intent of said user based on said user's vehicle's current speed and the present date, time, and the proximity to said user's preset destination provided by said display apparatus.

24. The system of claim 23, wherein once said parking intent is identified, said processing apparatus cross-correlates data in said unified database with present date, time, and type of user to determine said user potentially being in violation of one or more parking rules or regulations applicable to the intended parking location and generates one or more notifications applicable to said user.

25. The system of claim 24, said one or more memory units instruct said one or more processors to issue said one or more notifications to said user with the data type corresponding to the user type said user belongs to,
wherein said data type is selected from the group consisting of:
said commercial vehicle related data type corresponding to said commercial vehicle user type, and
said non-commercial vehicle related data type corresponds to said non-commercial vehicle user type.

26. The system of claim 25, said one or more notifications comprising one or more reasons for potentially receiving said parking violation citation availed from said unified database for said user's intended parking location.

27. The system of claim 26, wherein said one or more reasons for potentially receiving said parking violation citation comprise at least a portion of one or more currently enforced rules or regulations applicable to said user's intended parking location and the number of previously issued parking related violation citations at said user's intended parking location.

28. The system of claim 25, said one or more memory units instruct said one or more processors to send said user one or more notifications of one or more notices for temporary or permanent parking prohibitions applicable to one or more locations,
wherein said one or more notifications connect to said parking signage database and include applicable parking signage stored in said parking signage database.

29. The system of claim 28, wherein one or more notifications applicable to said user's current location automatically display said applicable parking signage on said user's display apparatus.

30. The system of claim 29, wherein said display apparatus operates through an interface of a mobile application on a mobile device or an interface of a navigation system of a vehicle.

* * * * *